(12) United States Patent
Shi et al.

(10) Patent No.: US 6,310,646 B1
(45) Date of Patent: Oct. 30, 2001

(54) METHOD AND APPARATUS FOR MEASURING A RADIO FREQUENCY SIGNAL HAVING PROGRAM INFORMATION AND CONTROL INFORMATION

(75) Inventors: Pingnan Shi; Andrew E. Bowyer, both of Indianapolis, IN (US); Qin Zhang, Bensalem, PA (US)

(73) Assignee: Wavetek Corporation, Indianapolis, IN (US)

( * ) Notice: Subject to any disclaimer, the term of this patent is extended or adjusted under 35 U.S.C. 154(b) by 0 days.

(21) Appl. No.: 08/979,104

(22) Filed: Nov. 26, 1997

Related U.S. Application Data

(60) Provisional application No. 60/033,346, filed on Nov. 29, 1996.

(51) Int. Cl.[7] .......................... H04N 17/02; H04N 5/455; G01R 25/02; H04B 17/00
(52) U.S. Cl. .......................... 348/194; 348/194; 348/192; 348/180; 348/726; 324/95; 455/67.3; 455/226.1; 455/226.2; 455/280
(58) Field of Search .................................... 348/2, 4, 5, 6, 348/180, 192, 726, 731, 194; 324/95, 529, 530, 627; 455/2, 67.3, 226.1, 226.2, 280; 370/207

(56) References Cited

U.S. PATENT DOCUMENTS

| | | | |
|---|---|---|---|
| 4,599,644 | * | 7/1986 | Fischer ................................. 358/84 |
| 5,294,981 | * | 3/1994 | Yazolino et al. ...................... 348/4 |
| 5,465,112 | * | 11/1995 | Nakao .................................. 348/4 |
| 5,477,150 | * | 12/1995 | Ham, Jr. et al. ..................... 324/536 |
| 5,495,282 | * | 2/1996 | Mostafa et al. ..................... 348/5 |
| 5,633,582 | * | 5/1997 | Orndorff et al. ..................... 324/95 |
| 5,777,662 | * | 7/1998 | Zimmerman ......................... 348/6 |
| 5,864,754 | * | 1/1999 | Hotto ................................. 455/280 |
| 5,889,759 | * | 3/1999 | McGibney ......................... 370/207 |
| 5,914,608 | * | 6/1999 | Wiseman et al. ..................... 324/522 |

\* cited by examiner

Primary Examiner—Reinhard J. Eisenzopf
Assistant Examiner—Paulos Natnael
(74) Attorney, Agent, or Firm—Maginot, Addison & Moore

(57) ABSTRACT

Disclosed are method and apparatus which measure signal level of an RF signal. The measured RF signal includes a baseband signal modulated onto a first carrier signal having a first frequency and the baseband signal includes program information and control information. The method and apparatus digitize the RF signal which includes the baseband control information and determine a signal level measurement from the baseband control information in the digitized RF signal. Furthermore, method and apparatus are disclosed which determine from the digitized RF signal whether a tagging signal is present in the RF signal.

54 Claims, 6 Drawing Sheets

METHOD AND APPARATUS FOR MEASURING A RADIO FREQUENCY SIGNAL HAVING PROGRAM INFORMATION AND CONTROL INFORMATION

CROSS REFERENCE TO RELATED APPLICATION

This application claims the benefit of U.S. Provisional Application No. 60/033,346, filed Nov. 29, 1996.

FIELD OF INVENTION

The present invention relates generally to RF test instruments, and more particularly to a RF leakage detector and signal level monitor for use in connection with CATV coaxial cable distribution networks.

BACKGROUND OF THE INVENTION

Community Antenna Television ("CATV") systems are used in a widespread manner for the transmission and distribution of television signals to end users, or subscribers. In general, CATV systems comprise a transmission subsystem and a distribution subsystem. The transmission subsystem obtains television signals associated with a plurality of CATV channels and generates a broadband CATV signal therefrom. The distribution subsystem then delivers the CATV broadband signal to television receivers located within the residences and business establishments of subscribers. The complexity and size of the distribution subsystem requires that operation and performance be periodically tested and/or monitored.

Two tests often performed by CATV service providers are signal level monitoring and leakage detection. CATV service providers use signal level monitors to measure the signal level of particular channel frequencies at any part of the distribution subsystem. A technician connects the signal level monitor to the coaxial cable at any location within the distribution subsystem. The signal level monitor allows the technician to obtain data regarding the frequency response of the distribution subsystem and identify distribution subsystem and transmission subsystem related problems.

Leakage detectors are devices that detect and/or measure the leakage of a broadband CATV signal from the distribution subsystem. Leakage refers to the transmission of signals through breaches or other nonconformities in the CATV distribution subsystem. In particular, the distribution subsystem, which typically comprises coaxial cable, amplifiers and other devices, ideally provides a relatively low-loss conduit between the CATV transmission subsystem and subscribers' television receivers. If, however, portions of the distribution subsystem are physically damaged, for example, the coaxial cable is damaged, kinked or broken, then the broadband CATV signal or portions thereof may leak through the damaged distribution subsystem causing unwanted transmission into the atmosphere. Since portions of the allocated CATV bandwidth overlap with frequencies allocated for aeronautical communication, excessive leakage of CATV signals can therefore undesirably interfere with aeronautical-related signal transmission and reception. As a result, government regulations permit only a finite level of CATV signal leakage. Leakage detectors help determine compliance with government regulations and can otherwise provide information as to the performance of particular sections of the distribution subsystem.

Signal level monitoring and leakage detection techniques typically use the signal level of the horizontal or vertical synchronization pulse of a television signal to provide an accurate and consistent measurement. To this end, signal level monitoring and leakage detection devices typically demodulated a television signal to be tested to obtain a baseband signal. Such devices then used analog or digital techniques to measure the level of either the vertical or horizontal synchronization pulses in the baseband signal.

A drawback to prior art signal level monitoring devices and leakage detection devices is their component cost. The circuitry used in such devices, including the analog circuitry used to perform demodulation of the television signal to be tested, adds significantly to the product cost. Furthermore, prior art signal level monitoring devices and leakage detection devices that utilize analog measurement circuitry suffer from additional drawbacks that are overcome by digital measurement circuitry. For example, due to component variances, analog measurement circuitry, requires calibration in order to obtain accurate readings; however, digital measurement circuitry does not effectively exhibit such variances. Furthermore, unlike digital measurement circuitry measurement levels provided by analog measurement circuitry will be effected due to age and temperature of the analog components comprising the analog measurement circuitry. Analog measurement circuitry is also not easily altered in order to perform additional functions or improvements over existing functions. Digital measurement circuitry, however, may be altered by simply providing the digital measurement circuitry with new software routines software upgrades.

Accordingly, there is a need for a signal level monitoring device that reduces component requirements in order to reduce its cost and that provides for digital measurement of the monitored signal level in order to overcome the above drawbacks of analog measurement. Likewise, there is a need for a leakage detection device that reduces component requirements in order to reduce its cost and that provides for digital measurement of the leakage signal level in order to overcome the above drawbacks of analog measurement.

SUMMARY OF THE INVENTION

The present invention fulfills the above need, as well as others, by providing a signal level monitor and a leakage detector that do not require analog components to effectuate demodulation of a television signal to be tested. Instead, the signal level monitor digitizes an intermediate frequency (IF) television signal and obtains a signal level measurement from control information embedded in the television baseband signal of the digitized IF television signal. Similarly, the leakage detector digitizes a received IF television signal and obtains a leakage detection measurement from control information embedded in the television baseband signal of the digitized IF television signal. The control information of a television baseband signal includes, for example, the vertical synchronization ("sync") information, the horizontal sync information, and potential quiet lines. As a result, the signal level monitor and the leakage detector of the present invention eliminate the costs associated with the analog demodulators of prior systems and remove drawbacks associated with analog measurement circuitry.

An exemplary method according to the present invention is a method of obtaining a measurement value representative of a signal level of a RF signal that includes a baseband signal modulated onto a first carrier signal having a first frequency, the baseband signal including (i) program information and (ii) control information. One step of the method includes converting the RF signal to an IF signal comprising the baseband signal modulated onto a second carrier signal of a second frequency wherein the IF signal includes (i) the program information of the baseband signal and (ii) the control information of the baseband signal. The method also includes the step of sampling the IF signal to obtain a digitized IF signal that is a digital representation of the baseband signal modulated onto the second carrier signal wherein the digitized IF signal includes a first digital representation of (i) the program information of the baseband signal and (ii) the control information of the baseband signal. Another step of the method includes the step of demodulating the digitized IF signal to obtain a digitized baseband signal that is a digital representation of the baseband signal wherein the digitized baseband signal includes a second digital representation of (i) the program information of the baseband signal and (ii) the control information of the baseband signal. Finally, the method of the present invention encompasses determining from the digitized baseband signal the measurement value that is representative of the signal level of the RF signal.

The present invention further includes various apparatus for carrying out the above method. For example, one apparatus according to the present invention includes an RF input, a frequency conversion circuit, an A/D converter, and a digital signal processing circuit. The RF input is configured to receive a RF signal that includes a baseband signal modulated onto a first carrier having a first frequency wherein the baseband signal includes (i) program information and (ii) control information. The frequency conversion circuit is coupled to the RF input and is configured to convert the RF signal to an IF signal comprising the baseband signal modulated onto a second carrier signal of a second frequency. The IF signal includes the program information of the baseband signal and the control information of the baseband signal. The A/D converter is coupled to the frequency conversion circuit and is configured to (a) receive the IF signal from the frequency conversion circuit, and (b) sample the IF signal to obtain a digitized IF signal comprising a first plurality of digital values representative of the baseband signal modulated onto the second carrier signal. The first plurality of digital values are also representative of (i) the program information of the baseband signal and (ii) the control information of the baseband signal. The digital signal processing circuit is coupled to the A/D converter and is configured to (a) receive the digitized IF signal from the AID converter, and (b) demodulate the digitized IF signal to obtain a digitized baseband signal comprising a second plurality of digital values representative of the baseband signal. The second plurality of digital values obtained by the digital signal processing circuit are also representative of (i) the program information of the baseband signal and (ii) the control information of the baseband signal. The digital signal processing circuit is also configured to determine from the control information included in the digitized baseband signal the measurement value that is representative of the signal level of the RF signal.

The above features and advantages, as well as others, will become more readily apparent to those of ordinary skill in the art by reference to the following detailed description and accompanying drawings.

DETAILED DESCRIPTION OF A PREFERRED EMBODIMENT

Figure 1:
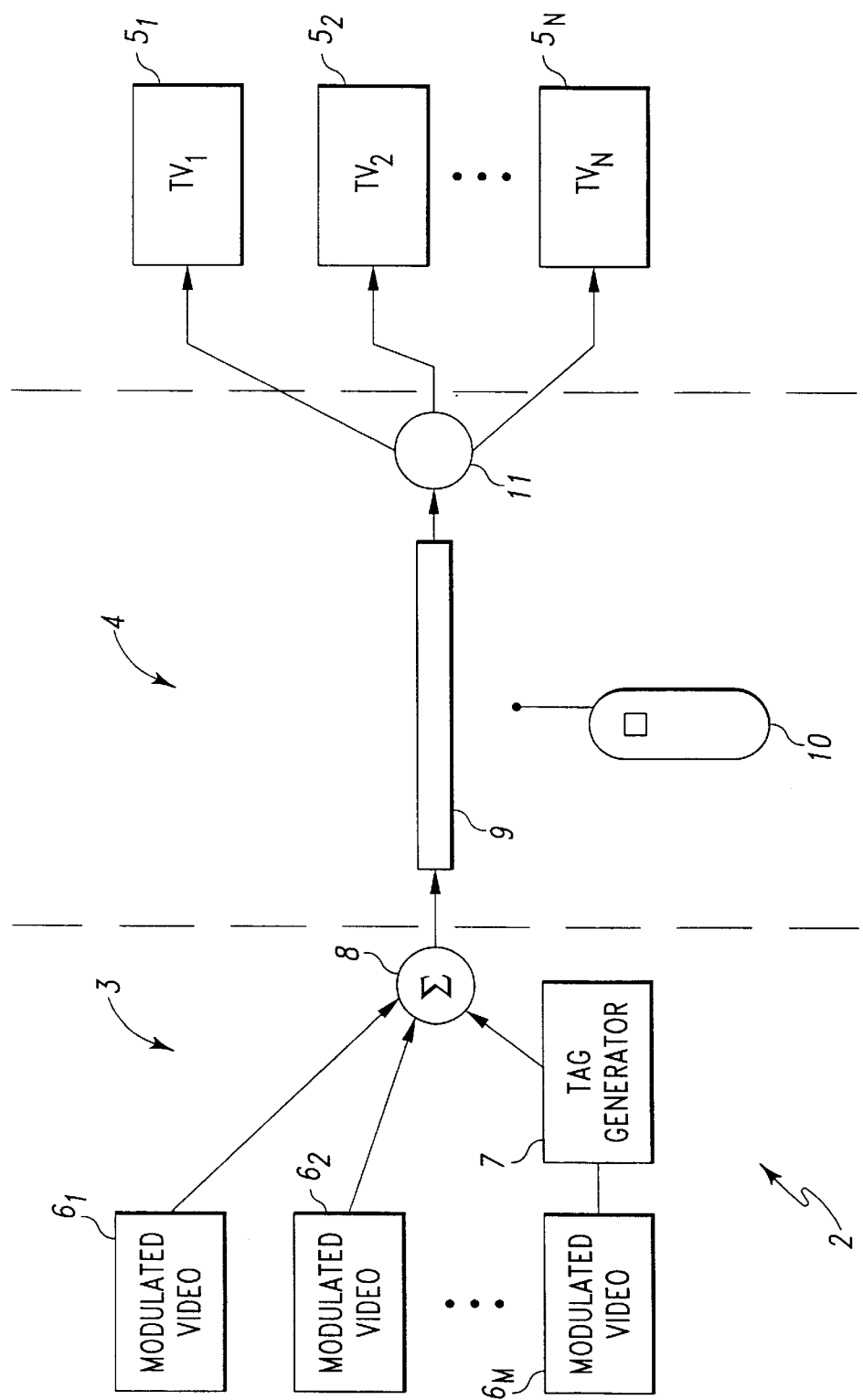
FIG. 1 shows a community antenna television system including a tagging signal generator that generates signals suitable for use with present invention.

FIG. 1 shows a prior art CATV system 2 for transmitting and distributing television signals and other information to subscriber reception devices. The CATV system 2 transmits and distributes television signals in the NTSC standard format, which is well known to those of ordinary skill in the art. The CATV system 2 includes a head end transmission subsystem 3, a distribution subsystem 4, and a plurality of subscriber receivers shown by example herein as television receivers $5_1$, $5_2$, ... $5_N$. Subscriber receivers may alternatively include, among other things, video monitors and computer monitors.

The transmission subsystem 3 includes a plurality of sources of television signals, shown by example herein as modulated video sources $6_1$, $6_2$, ... $6_M$, and further includes a tagging signal generator 7 and a combiner 8. The transmission subsystem 3 is operable to generate a CATV signal and a tagging signal as is known in the art. In general, a CATV signal as described herein includes, among other things, at least one television signal, the television signal including a baseband television signal modulated onto a carrier signal. Each carrier signal has a frequency associated with one of a plurality of CATV channels.

The modulated video source $6_1$ is a circuit well known in the art that includes a carrier signal generator, not shown, and a baseband television signal source, not shown. The modulated video source $6_1$ is operable to generate a television signal which comprises a carrier signal modulated by a baseband television signal. Likewise, the modulated video sources $6_2$ ... $6_M$ are operable to generate television signals which comprise carrier signals modulated by television baseband signals. Specifically, each modulated video source $6_x$ generates a carrier signal modulated by a baseband television signal having a standard format that includes program information and control information. In most systems, the program information consists of the image information, such as chrominance and luminance information, and audio information. By contrast, the control information in general, does not include such image or audio content. The control information instead comprises horizontal and vertical sync information, and may further include so-called quiet lines. Important aspects of the control information is that the control information follows a repeating pattern for each frame of video information and that, unlike the program information, the control information does not vary in magnitude from frame to frame. For example, the vertical sync information of a NTSC television signal, referred to as the vertical interval, occurs every field at a frequency of approximately 60 Hz and the vertical sync pulses of the vertical interval have relatively constant peak magnitudes from field to field. Horizontal sync information and quiet lines also occur at regular repeating intervals.

Figure 2:
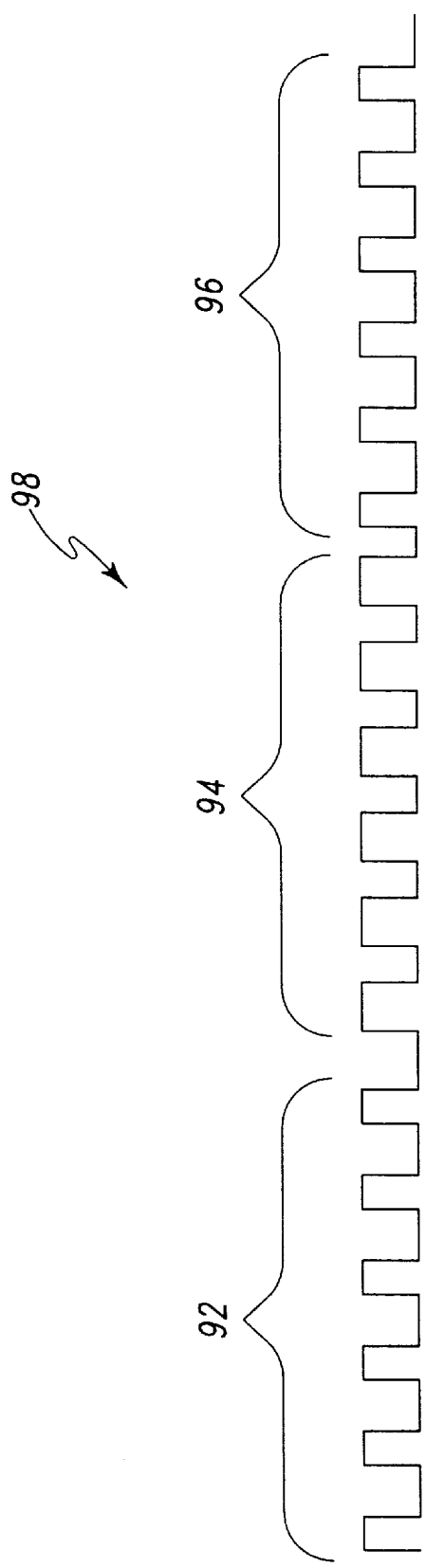
FIG. 2 shows a diagram of the vertical sync pulse interval utilized by television signals in accord with the NTSC format.

The vertical interval of the NTSC format is shown in FIG. 2. As depicted the vertical interval includes a first equalizing pulse interval 92, a vertical sync pulse interval 94, and a second equalizing pulse interval 96. The first equalizing pulse interval 92 includes six equalizing pulses, the vertical sync pulse interval 94 includes six vertical sync pulses 98, and the second equalizing pulse interval 96 includes six equalizing pulses. The first equalizing interval 92, the vertical sync pulse interval 94, and the second equalizing interval 96 are each approximately 192 microseconds ($\mu s$) long. Furthermore, each equalizing pulse is approximately 2.54 $\mu s$ wide and is approximately 29.21 $\mu s$ from the previous equalizing pulse. In contrast, each vertical sync pulse 98 is approximately 27.31 $\mu s$ wide and is approximately 4.45 $\mu s$ from the previous vertical sync pulse.

Referring back to FIG. 1, each modulated video source $6_x$ is typically associated with one of a plurality of CATV channels. Specifically, the television signal carrier frequency, or CATV channel frequency, corresponds to an associated CATV channel. The CATV channel frequencies are typically within the 5 MHz to 890 MHz frequency band, and are separated by a predetermined frequency interval. In United States cable systems, the CATV channel frequencies are typically separated by 6 MHz or integer multiples thereof. The modulated video sources $6_1, 6_2, \ldots 6_M$ are each connected to the signal combiner 8, which combines the various television signals into a single broadband CATV signal. In order to provide a tagging signal for identification by an exemplary embodiment of the present invention, the modulated video source $6_M$ is connected to the signal combiner 8 through the tagging signal generator 7.

The tagging signal generator 7 is operable to receive the television signal from the modulated video source $6_M$ and to depth-modulate a low frequency tagging signal onto the television signal. A combined signal level monitor and leakage detector ("combined monitor/detector") 10 which incorporates various features of the present invention therein is operable to isolate or detect with 1 Hz resolution a 3 dB depth-modulated tagging signal having a sine wave component of 3–20 Hz. As a result, the tagging signal generator 7 depth-modulates a tagging signal with the above properties onto the television signal in order to enable the combined monitor/detector 10 to detect presence of the tagging signal. Detection of a unique tagging signal utilized by the CATV system 2 confirms that the CATV system 2 is the likely source of detected leakage signals. Such confirmation of source allows the combined monitor/detector 10 to distinguish leakage signals of the CATV system 2 under test from either spurious signals of unknown origin or leakage signals of a co-located CATV system.

The combiner 8 is connected to the modulated video sources $6_1 \ldots 6_M$. The combiner 8 is operable to receive modulated television signals from the modulated video sources $6_1 \ldots 6_M$ and to combine them into a broadband CATV signal which is to provided to the distribution subsystem 4. The distribution subsystem 4 typically comprises a plurality of elements including coaxial cable, repeater amplifiers, splitters and other elements typically employed by CATV service providers. By way of representative illustration only, the distribution subsystem 4 is shown herein as including a cable 9 and a splitter 11. The cable 9 typically comprises a network of coaxial cable or other suitable conduit for transmission of CATV signals through a geographical area interspersed with subscribers.

In the example discussed herein, the cable 9 connects the combiner 8 to the splitter 11. The splitter 11 is then connected to the plurality of television receivers $5_1 \ldots 5_N$. The television receivers $5_1 \ldots 5_N$ are, in general, commercially available television receivers designed or adapted to receive CATV signals and tune to particular channels within the CATV signal. While the performance of various types of televisions differ somewhat, substantially all commercially available televisions are designed to include tuning and filtering equipment having a minimum standard performance criteria.

Regardless of the particular make-up, the distribution subsystem 4 is susceptible to faults, cable breaches, faulty interconnections, and other nonconformities that allow leakage and reduce television signal level. Leakage refers to egress of CATV signals from the distribution subsystem 4. The egress of the CATV signal out of the distribution subsystem 4 can potentially interfere with aeronautical communication. Furthermore, the detection of leakage also indicates a likely occurrence of ingress of spurious signals into the distribution subsystem 4. The ingress of spurious signals increases the noise within the CATV system. Television signal level refers to the root-mean-square power level of the television signal. A reduction in television signal level may result in reduced quality of the television signal as displayed by the television receivers $5_1 \ldots 5_N$.

In general, the plurality of the modulated video sources $6_1 \ldots 6_M$ generate television signals associated with one of a plurality of CATV channels. As discussed above, the baseband television signal comprises program information, in other words, information related to image and audio content, and control information, such as synchronization information. The format of a television baseband signal is standardized such that the control information is substantially similar on all television baseband signals. For the purposes of this description, control information includes the horizontal synchronization pulses, the vertical interval, and quiet lines that may or may not be used to transmit other non-image related information.

The operation of the modulated video carrier $6_M$ is now discussed in further detail as it relates to tag insertion. The modulated video carrier $6_M$ generates a first television signal and provides that signal to the tagging signal generator 7. The tagging signal generator 7 then generates a unique tagging signal, preferably between 3 Hz and 20 Hz and then depth-modulates the tagging signal onto the first television signal by a depth of 3 dB.

The tagging signal generator 7 then provides the first television signal and tagging signal to the combiner 8. The combiner 8 then combines those signals with the television signals from the other modulated video sources $6_1 \ldots 6_M$ to produce a broadband CATV signal for transmission. The combiner 8 provides the broadband CATV signal to the cable 9.

The broadband CATV signal traverses the cable 9 to the splitter 11. The splitter 11 then distributes the broadband CATV signal to each of the television receivers $5_1 \ldots 5_N$. One or more of the television receivers $5_1 \ldots 5_N$ tunes to a select CATV channel and performs the appropriate signal processing to provide a visible and audible presentation of the program information.

The tagging signal does not significantly interfere, nor perceptively interfere, with the visible and audible presentation of the program information in the first television signal or any other television signal. In particular, a standard automatic gain control ("AGC") within the television receivers $5_1 \ldots 5_N$ substantially compensates for low frequency amplitude modulations. Accordingly, the AGC of a typical television receiver tuned to receive the first television signal would essentially filter out the tagging signal.

While the tagging signal is substantially transparent or undetectable by the end user, the combined monitor/detector 10 readily detects the tagging signal if placed in the vicinity of leakage in the distribution subsystem 4. In leakage detection operation, a field technician moves the combined monitor/detector 10 along various portions of the distribution subsystem 4 to attempt to identify sources of leakage. The combined monitor/detector 10 detects RF signals and is further operable to identify the distinctive low frequency tagging signal that has been modulated onto the carrier signal. If the combined monitor/detector 10 detects sufficient signal energy within the appropriate signal band, and further identifies a substantial low frequency tagging signal component in the detected signal energy, then the technician may determine the existence and location of a leakage situation in the distribution subsystem 4.

Furthermore, in signal level monitoring, a technician may couple the combined monitor/detector 10 to the distribution subsystem 4 to monitor television signal levels of variously transmitted CATV channels. The technician may either configure the combined monitor/detector 10 to monitor a single CATV channel frequency or several CATV channel frequencies. If the combined monitor/detector 10 does not detect suitable signal level at the point of connection for a given CATV channel, then the technician may determine the existence of a fault in the transmission subsystem 3 or the distribution subsystem 4.

Figure 3:
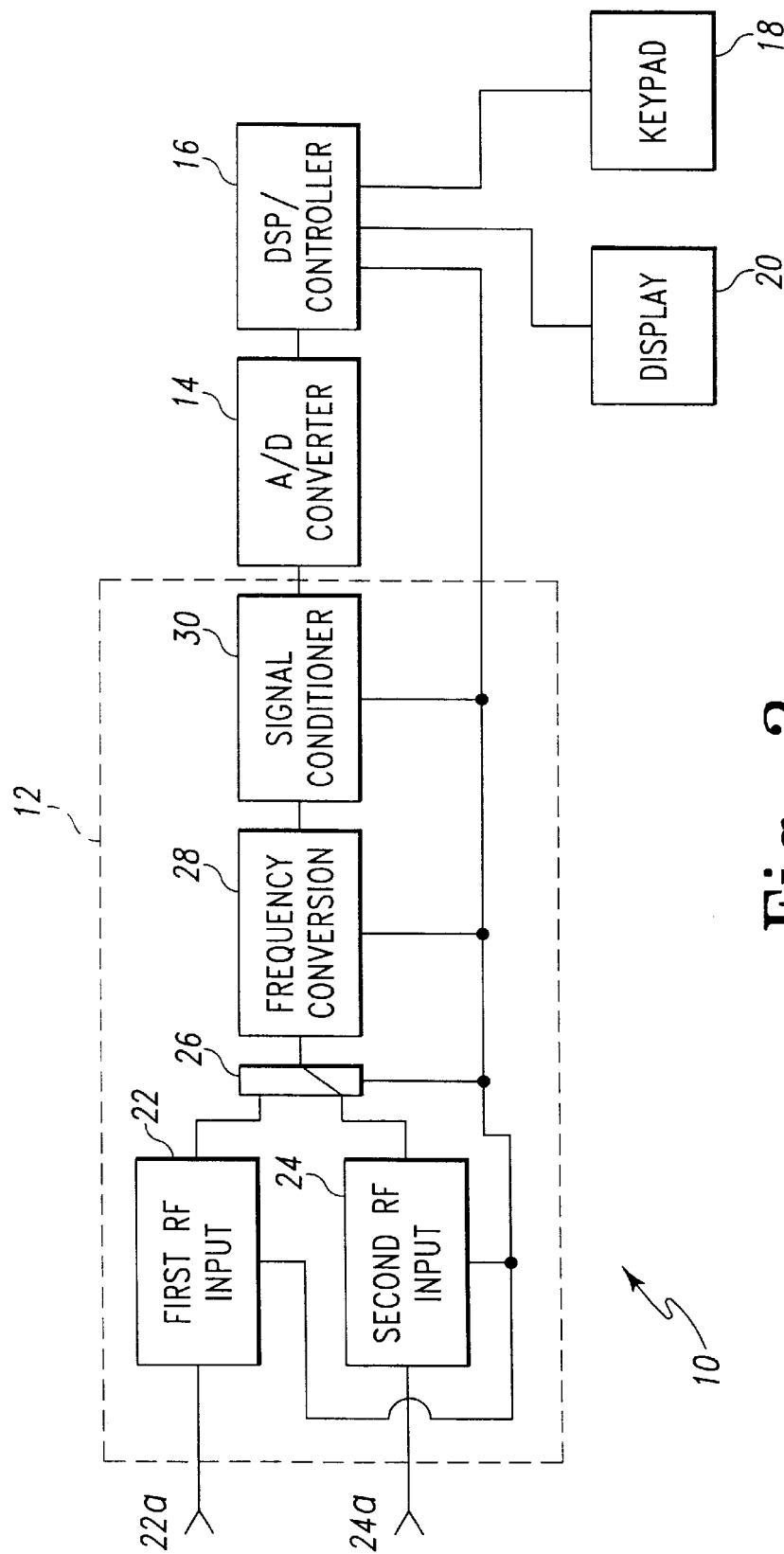
FIG. 3 shows a simplified block diagram of a combined signal level monitor and leakage detector which incorporates various features of the present invention therein.

FIG. 3 shows a circuit schematic block diagram of the combined monitor/detector 10 which incorporates various features of the present invention therein. The combined monitor/detector 10 includes an RF circuit 12, a analog to digital ("A/D") converter 14, a digital signal processor and controller ("DSP/controller") 16, a keypad 18, and a display 20. The RF circuit 12 further includes a first RF input 22, a second RF input 24, a coupling device 26, a frequency conversion circuit 28, and a signal conditioner 30.

The first RF input 22 comprises an input stage that is operable to receive and provide initial conditioning to first input signals received through a CATV coaxial cable connection 22a. The first input signals are RF signals having a frequency in a first frequency range. In a CATV testing implementation, the first RF input 22 would be operable to receive RF signals in a is frequency range between 5 MHz and 890 MHz. In general, the first RF input 22 provides initial conditioning to the input signals by providing amplification, filtering, and impedance matching if necessary. The first RF input 22 does not perform any frequency conversion. The first RF input 22 is connected to the coupling device 26.

The second RF input 24 comprises an input RF stage that is operable to receive and provide conditioning to leakage input signals received from an antenna 24a. The leakage signals are also within the first frequency range. In a CATV testing implementation, the leakage signals of interest are in a frequency band of approximately 115 MHz to 140 MHz. Although leakage signals exist at many frequencies, the frequency band 115 MHz to 140 MHz is preferable for measuring leakage signals because U.S. regulations limit the amount of leakage at this frequency band since this frequency band is utilized for aeronautical communications. The frequency band 115 MHz to 140 MHz is also preferable because that frequency band is less susceptible to external RF signals that could interfere with leakage measurement accuracy. Similar to the first RF input 22, the second RF input 24 amplifies and filters the leakage input signals. Because detected leakage signals are typically of much smaller magnitude than the first input signals received through the cable connection 22a, the second RF input 24 includes greater amplification than the first RF input 22. The second RF input 24 is also connected to the coupling device 26.

The frequency conversion circuit 28 includes one or more frequency conversion stages that are operable to receive RF signals in a first frequency range and convert those RF signals into signals of a second frequency range. The first frequency range includes the frequency range of all signals to be monitored and the frequency range of the leakage signal to be detected, which ranges are typically coextensive. Thus, in the CATV testing implementation discussed the first frequency range would be between 5 MHz and 890 MHz. The second frequency range should essentially comprise an intermediate frequency ("IF") plus some tolerance range. As a result, according to the exemplary implementation of the invention describe herein, the frequency conversion circuit 28 is operable to receive signals within the first frequency range, from 5 MHz to 890 MHz, and produce signal having a carrier frequency that is approximate equal to IF.

The coupling device 26 may suitably be any device or circuitry that connects both the first RF input 22 to the frequency conversion circuit 28 and the second RF input 24 to the frequency conversion circuit 28 while providing isolation between the first RF input 22 and the second RF input 24. The coupling device 26 may, for example, be a diode switch, a GaAs FET switch, or a hybrid directional RF coupler.

The frequency conversion circuit 28 is operably connected to the signal conditioner 30 that provides conditioning to the IF signal received from the frequency conversion circuit 28. The conditioning circuit 30 includes amplifiers and filters that provide suitable signal levels that allow the DSP/controller 16 to perform the appropriate signal level measurement and/or leakage signal detection.

Accordingly, the RF circuit 12 is generally operable to receive, alternately, first RF signals from a CATV coaxial cable connection 22a and RF leakage signals from an antenna 24a and provide an output signal therefrom, the output signal comprising a conditioned IF signal suitable for leakage detection and signal level monitoring analysis.

The A/D converter 14 is coupled to the signal conditioner 30. The A/D converter 14 digitizes the conditioned IF signal received from the RF circuit 12 to obtain a digitized IF signal. To this end, the A/D converter 14 samples the conditioned IF signal at a sampling rate to obtain a plurality of digital values that are representative of the conditioned IF signal.

The DSP/controller 16 is connected to the A/D converter 14. The DSP/controller 16 is a circuit operable to perform both leakage signal detection and signal level monitoring. In contrast to prior art devices, the DSP/controller 16 allows the leakage detection and signal level monitoring to be perform in the digital domain. In any event, the DSP/controller 16 is operably connected to control the operations of the first RF input circuit 22, the second RF input 24, the coupling device 26, the frequency conversion circuit 28, and the signal conditioner 30. The DSP/controller 16 is further connected to the keyboard 18 and the display 20. The keyboard 18 provides a means for accepting user input and the display 20 provides a means for communicating results to a user. Results may also be communicated by an audible signal, including those generated using speech synthesis. Alternatively, results may be provided to a communications circuit, not shown, to facilitate the transfer of the results information to a remote device.

In operation, the user may manually select via the keypad 18 whether the combined monitor/detector 10 is to perform signal level monitoring or leakage detection

Signal Level Monitoring

For signal level monitoring, a technician couples the combined monitor/detector 10 to the distribution subsystem 4 and selects via the keypad 18 signal level monitoring mode. Furthermore, the technician typically selects via the keypad 18 a particular channel frequency within the CATV frequency spectrum to be monitored. The DSP/controller 16 in response to the selections causes the coupling device 26 to connect the first RF input 22 to the frequency conversion circuit 28. The DSP/controller 16 also configures the frequency conversion circuit 28 to convert signals at the selected frequency to the IF signal frequency.

The first RF input 22 then receives and conditions the RF input signal that includes the selected channel frequency. The first RF input 22 conditions the RF signal and then provides the RF signal to the frequency conversion circuit 28. The frequency conversion circuit 28 performs a frequency conversion on the RF input signal such that the selected channel frequency is converted to a frequency that is approximately equivalent to the IF signal frequency. The converted input signal or IF signal is then provided to the signal conditioner 30 which filters the IF signal, leaving predominantly just the IF signal frequency component. The resultant filtered signal is essentially a down-converted version of the selected channel frequency, referred to herein as the conditioned IF signal. The A/D converter 14 then digitizes the conditioned IF signal.

To measure the signal level of the conditioned IF signal, the DSP/controller 16 essentially locates the sync pulses in the digitized IF signal and derives root-mean-square ("RMS") data therefrom. The RMS signal level data is provided to the DSP/controller 16, which processes the RMS signal level data to determine a measured signal level value. The DSP/controller 16 takes into account any gain adjustment or normalization performed by the RF circuit 12 when determining the measured signal level value. The measured signal level value may then be displayed or communicated.

The operation of the DSP/controller 16 to generate the RMS signal level data is described below. Specifically, the DSP/controller 16 demodulates the digitized IF signal. To this end, the DSP/controller 16 takes the absolute value of the digitized IF signal and then applies digital low pass filtering methods. The DSP/controller 16 then collects the peak sample values of the vertical sync pulses. To this end, the DSP/controller 16 finds the maximum sample value of the demodulated IF signal over one field of the video signal (e.g. a $60^{th}$ of a second in NTSC) to obtain the vertical sync pulse for the field. The DSP/controller 16 averages peak values from a plurality of vertical sync pulses over time. The averaging function helps to reduce noise. Furthermore, when measuring the signal level of a tagged signal, the averaging function also negates the effects of the low frequency tagging signal that was depth-modulated on the video signal when it was originated. As stated above, tagging signals are low frequency depth-modulated signals that allow tag detectors to determine or isolate the source of the leakage signal. In particular, when measuring a tagged signal, the DSP/controller 16 averages the peaks of sync pulses over at least one cycle of the tagging signal in order to average out the swing attributable to the superimposed tagging signal. Furthermore, the DSP/controller 16 compensates the obtained average peak value for loss due to the depth-modulation of the tagging signal.

Leakage Detection

If leakage detection is selected, the DSP/controller 16 causes the coupling device 26 to connect the second RF input 24 to the frequency conversion circuit 28, which in turn disconnects the first RF input 22 from the frequency conversion circuit 28. The DSP/controller 16 then configures the frequency conversion circuit 28 to convert signals within the leakage signal frequency range to the IF signal frequency. In the exemplary embodiment herein, leakage signals have a frequency range of approximately 115 MHz to 140 MHz.

The second RF input 24 then receives and conditions the leakage signal, to the extent there is any. The second RF input 24 conditions the leakage signal and then provides the leakage signal to the frequency conversion circuit 28. The frequency conversion circuit 28 performs a frequency conversion on the leakage signal such that the leakage signal is converted to having a frequency at approximately the IF signal frequency. The converted leakage signal, or IF signal, is then provided to the signal conditioner 30 which filters the IF signal. The filtered IF signal consists essentially of a down-converted version of the original leakage signal, and is referred to herein as the conditioned IF signal. The A/D converter 14 then digitizes the conditioned IF signal.

The DSP/controller 16 then performs leakage detection one the digitized IF signal. Specifically, the DSP/controller 16 demodulates the digitized IF signal. To this end, the DSP/controller 16 takes the absolute value of the digitized IF signal and then applies digital low pass filtering methods. The DSP/controller 16 then uses digital correlation calculations to isolate the vertical sync pulses from the demodulated IF signal. The correlation calculation uses the known field frequency (e.g. 60 Hz in NTSC) of a video signal in order to isolate the vertical sync pulses, which occur once per field. Those of ordinary skill in the art may use a Fast Fourier Transform ("FFT") or other digital correlation technique to isolate the vertical sync. pulses. For example, a time domain correlation to the field frequency may be implemented through the use of a pulse train that corresponds to the field frequency.

The DSP/controller 16 then collects the peak sample values of the isolated vertical sync pulses. The DSP/controller 16 averages peak values from a plurality of vertical sync pulses over time. The averaging function helps to negate the effects of any low frequency tagging signal that may have been superimposed on the leakage signal when it was originated. As stated above, tagging signals are low frequency amplitude modulated signals that allow tag detectors to determine or isolate the source of the leakage signal. The DSP/controller 16 averages the peaks of several sync pulses in order to average out the swing attributable to the superimposed tagging signal. The DSP/controller 16 then compensates the average peak value for loss due to the tagging signal.

Furthermore, the DSP/controller 16 correlates the digitized and demodulated conditioned IF signal to a predetermined or user programmable tagging signal to obtain a tagging ratio. The DSP/controller 16 then compares this tagging ratio to a threshold value and generates a tag present signal if the tagging ratio has a predetermined relationship to the threshold value.

Combined Monitor/Detector Schematic

Figure 4:
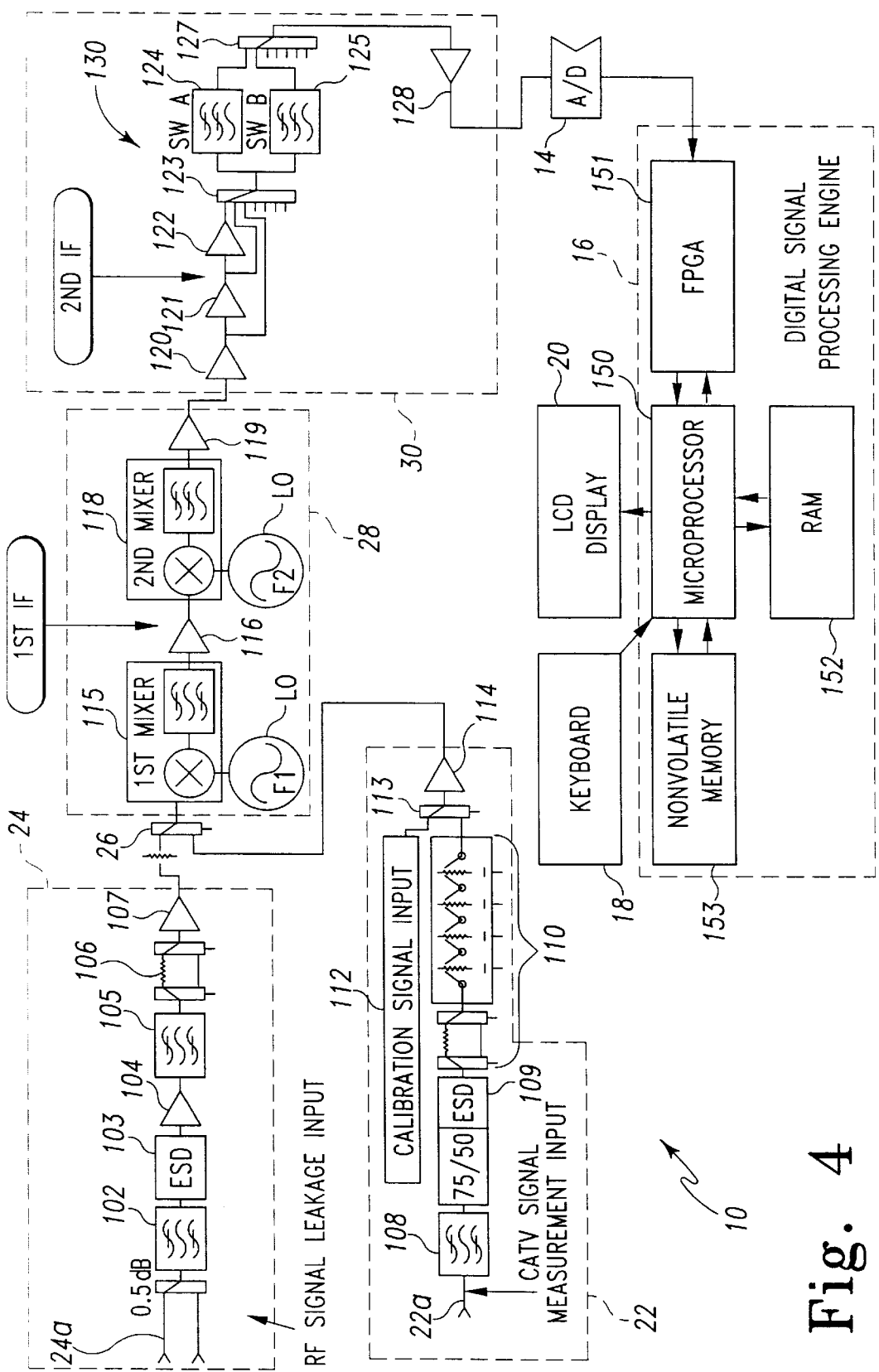
FIG. 4 shows a detailed circuit diagram of the combined signal level monitor and leakage detector of FIG. 3.

FIG. 4 shows a more detailed schematic diagram of the combined monitor/detector 10. For convenience, equivalent components in FIG. 3 are identified by the same reference numerals in FIG. 4. As shown in FIG. 4, the first RF input 22 includes a bandpass filter 108, an impedance matching circuit 109, a variable attenuator 110, a calibration signal input 112, a calibration signal switch 113, and an amplifier 114. The bandpass filter 108, the impedance matching circuit 109, and the variable attenuator 110 are serially connected. The bandpass filter 108 is further connected to the coaxial cable connection 22a.

The bandpass filter 108 is an RF filter that has a pass band consisting of the entire CATV spectrum, which currently is 5 MHz to 890 MHz. The impedance matching circuit 109 may suitably be any known transformer that converts the characteristic impedance of the RF circuit from 75 ohms to 50 ohms. The impedance matching circuit 109 also preferably includes an electrostatic discharge protection circuit ("ESD"). Such circuits are well known. The variable attenuator 110 includes a plurality of switchable impedance stages controlled by the DSP/controller 16. The DSP/controller 16 adjusts the attenuation provided at the first RF input 22 based on the control characteristics. For example, if the input signal is very strong, the DSP/controller 16 may increase the attenuation to reduce the amplitude of the signal to scale, or normalize, the signal into the preferred levels for carrying out the signal level monitoring measurements. Likewise, if the input signal is weak, the DSP/controller 16 may reduce the attenuation to increase the amplitude of the signal. The DSP/controller 16 adjusts the impedance by selectively activating the various impedance stages. In the exemplary embodiments, the variable impedance attenuator 110 includes independently actuatable stages of 23 dB, 16 dB, 8 dB, 4 dB, and 2 dB of attenuation, respectively.

The calibration signal input 112 is operable to be connected to a source of calibration signals. The calibration signals are employed to allow the DSP/controller 16 to calibrate the circuit as necessary to compensate for the effects of temperature variation on the RF circuit devices within the RF circuit 12. The calibration signal switch 113 is an electronically controlled switch that alternatively connects the signal level monitor signal path, in other words, the variable attenuator 110, and the calibration signal input l 12 to the amplifier 114. The amplifier 114 is an RF amplifier that provides approximately 13 dB of gain. The amplifier 114 is thereafter connected to the coupling device 26.

The second RF input 24 includes the following serially connected components: a bandpass filter 102, an ESD 103, a first leakage amplifier 104, a bandpass filter 105, a variable attenuator 106, and a second leakage amplifier 107. The bandpass filter 102 is further connected to the antenna 24a, and the second leakage amplifier 107 is further connected to the coupling device 26.

The bandpass filters 102 and 105 are each RF filters having a pass band of between 115 MHz and 140 MHz. The ESD 103 includes any well known electrostatic discharge device, including a Schottky diode circuit intended for ESD operation. The first leakage amplifier 104 is an RF amplifier that provides approximately 12 dB of gain, and the second leakage amplifier 107 is an RF amplifier that provides approximately 31 dB of gain.

The coupling device 26 is preferably an electronically controlled RF switch, such as a diode switch or a GaAs FET switch. The coupling device 26 is further connected to the frequency conversion circuit 28. The frequency conversion circuit 28 includes the following serially connected components: a first conversion stage 115, a first IF amplifier 116, a second conversion stage 118, and a second IF amplifier 119.

Each of the conversion stages comprises a frequency conversion circuit including a mixer, a local oscillator ("LO"), and a filter. The LOs of the first and second conversion stages 115 and 118, respectively, are connected to and controlled by the DSP/controller 16. The first an second IF amplifiers 116 and 119 are each RF amplifiers that provide approximately 20 dB of gain.

The conditioning circuit 30 includes a variable amplification stage 130 and a variable filter stage 140. The variable amplification stage 130 includes a multiplexer 123, and a first, second and third op-amp amplifiers 120, 121, and 122 that are serially connected. The first op-amp amplifier 120 provides 20 dB of gain, the second op-amp amplifier 121 provides 6 dB of gain, and the third op-amp amplifier 122 provides 24 dB of gain. The multiplexer 123 has inputs connected to the output of each of the first, second and third op-amp amplifiers 120, 121, and 122, respectively. The multiplexer 123 is operably connected to the DSP/controller 16, and may be controllably operated to connect any one of the multiplexer inputs to the multiplexer output. In this manner, the DSP/controller 16 may select the gain provided by the variable amplification stage 130 to be either 20 dB as provided by the first op-amp amplifier 120, 26 dB as provided by the combination of the first and the second op-amp amplifiers 120 and 121, or 50 dB as provided by the combination of all three op-amp amplifiers 120, 121, and 122.

The use of a step adjustable op-amp amplification stage provides cost advantages over the devices used for similar purposes in the prior art. In the prior art, variable gain in the conditioning portion of the IF circuit in a combined signal level monitor and leakage detector was accomplished by an integrated circuit logarithmic amplifier. The step adjustable op-amp amplification stage provides similar functionality at a reduced cost.

It is to be noted that the use of a relatively low IF signal frequency of 75 kHz allows for the use of relatively inexpensive filter and amplifier components in the conditioning circuit 30. Furthermore, the use of relatively low IF signal frequency also allows for easier analog to digital conversion thus enabling relatively inexpensive components to implement the A/D converter 14.

The variable filter stage 140 includes first and second low pass filters 124 and 125, respectively. The first low pass filter 124 has a cut off frequency at or near the system IF signal frequency. In the exemplary embodiment described herein, the IF signal frequency is approximately 75 kHz. As a result, the first low pass filter will have a cut off frequency of just above 75 kHz, such as for example, 95 kHz.

The second low pass filter 125 has a cut off frequency that is substantially higher. While the use of a relatively low IF signal frequency of 75 kHz provides the advantages outlined above relating to component costs and digitization, the 75 kHz is lower than the high frequency components of the vertical and horizontal sync pulses. The horizontal and vertical sync pulses are typically used by the DSP/controller 16 to identify and monitor signal levels for scrambled CATV signal. Because scrambled CATV signals may often have suppressed horizontal and o vertical sync pulses, it is preferable to include many of the higher frequency components of the sync pulses to make them easier to detect and measure. Accordingly, the second low pass filter 125 is set at a higher frequency cut off, for example, of 280 kHz in order to preserve the necessary frequency components of the horizontal and vertical sync pulses in monitoring signal level of scrambled signals.

The first and second low pass filters 124 and 125 are thereafter connected through a switch 127 to the RF circuit output 128. The RF circuit output 128 is connected to the A/D converter 14.

In operation, the RF circuit 12 receives either leakage signals or signal level monitoring signals and produces therefrom normalized, amplified, filtered and down-converted IF signals therefrom. Regardless of the source or strength of the received signal, the RF circuit 12 produces conditioned IF signals of substantially consistent amplitude and frequency. The conditioned IF signals in such a form are suitable for either signal level monitoring or leakage detection.

The A/D converter 14 digitizes the conditioned IF signal received from the RF circuit 12 and provides the digitized IF signal to the DSP/controller 16. To this end, the A/D converter 14 samples the conditioned IF signal at a sampling rate that is greater than or equal to the Nyquist rate for the conditioned IF signal. In particular, the A/D converter 14 samples the conditioned IF signal at a 1 MHz sampling rate to obtain a digitized IF signal comprising a plurality of 12-bit samples that are representative of the conditioned IF signal. It should be appreciated that the 1 MHz sampling rate is well above the Nyquist rate since the first and second low pass filters 124 and 125 have cut off frequencies lower than 280 KHz.

The DSP/controller 16 is connected to the A/D converter 14 in order to receive the digitized IF signal. The DSP/controller 16 is configured to control the various components of the combined monitor/detector 10. The DSP/controller 16 is also configured to determine the RMS level of the conditioned IF signal and to detect presence of a tagging signal in the conditioned IF signal. To this end, the DSP/controller 16 includes a microprocessor 150, a field programmable gate array ("FPGA") 151, a random access memory ("RAM") 152, and a nonvolatile memory 153.

The FPGA 151 in an exemplary embodiment is a XC3042A manufactured by Xilinx, Inc. The FPGA 151 is configured to provide an interface between the A/D converter 14 and the microprocessor 150. To this end, the FPGA 151 is configured to perform preliminary processing of the digitized IF signal in order to alleviate the microprocessor 150 of some of the processing burden. In particular, the FPGA 151 is configured to decimate the digitized IF signal thus reducing the number of 12-bit samples used to represent the conditioned IF signal. By reducing the number of samples used to represent the IF signal, a fewer number of samples are presented to the microprocessor 150 for processing, thus reducing the processing burden associated with the digitized IF signal and providing the microprocessor 150 with time to do other tasks.

The microprocessor 150 in an exemplary embodiment is a MC68331 which is a 32-bit integrated microcontroller manufactured by Motorola, Inc. The microprocessor 150 is configured to generate the various control signals which configure the RF circuit 12 for signal level monitoring or leakage detection modes. To this end, the microprocessor 150 is configured to execute algorithms stored in the RAM 152 which implement the control logic necessary to provide appropriate control signals for the RF circuit 12. The microprocessor 150 is also configured to control the keyboard 18 and the display 20 and to perform the signal processing of the decimated IF signal. In processing the decimated IF signal, the microprocessor 150 is generally configured to obtain peak values for the vertical sync pulses that are present in the control information of the television signals and from these obtained peak values to determine a RMS measurement value for the received television signal represented by the conditioned IF signal. Furthermore, when processing the digitized IF signal in leakage detection mode, the microprocessor 150 is further configured to correlate the decimated IF signal with a tagging signal in order to determine whether the tagging signal is present in the received television signal.

The RAM 152 comprises circuitry suitable for storing digital information. In particular, the RAM 152 includes at least enough storage capacity to store one field of the decimated IF signal and the DSP algorithms that configure the microprocessor 150 to process the decimated IF signal. The nonvolatile memory 153 is configured to store the DSP algorithms and other routines utilized by the microprocessor 150 in a nonvolatile manner. The nonvolatile memory 153 is preferably implemented as an EPROM, an EEPROM, a PROM, a ROM, a flash memory, or a battery backed CMOS RAM. The main purpose of the nonvolatile memory 153 is to store, during periods in which the combined monitor/detector 10 is powered down, the various algorithms that are executed by the microprocessor 150.

Signal Level Monitoring

To measure signal level of monitored signals, the microprocessor 150 causes the coupling device 26 to connect the first RF input 22 to the frequency conversion circuit 28. The microprocessor 150 also causes the calibration signal switch 113 to connect the variable attenuator 110 to the amplifier 114. The microprocessor 150 may, after a number of signal level measurements, cause the calibration signal switch 113 to connect the calibration signal input 112 to the amplifier 114 to facilitate calibration. Ordinarily, however, the calibration signal switch 113 is configured to connect the variable attenuator 110 to the amplifier 114 to facilitate signal level measurements. In addition, the microprocessor 150 causes the switch 127 to connect the first low pass filter 124 to the RF circuit output 128 for measurement of unscrambled CATV channels. If a scrambled channel is to be measure, the microprocessor 150 causes the switch 127 to connect the second low pass filter 124 to the RF circuit output 128.

Monitored signals are received through the coaxial connection 22a and then filtered by the bandpass filter to remove frequency components outside the CATV frequency spectrum of 5 MHz to 890 MHz. The variable attenuator 110 then provides attenuation to the monitored signals at a level selected by the microprocessor 150. The microprocessor 150 selects the attenuation level based on the strength of the received signal. The microprocessor 150 later factors the attenuation level into its determination of signal level.

The monitored signals then propagate through the calibration signal switch 113 to the amplifier 114, which amplifies the monitored signals by approximately 13 dB. The amplifier 114 further sets the noise factor for the monitored signals.

The first conversion stage 115 and the second conversion stage 118 operate together to convert signals in a select channel frequency band to a frequency approximately equivalent to the IF signal frequency, 75 kHz. To this end, the first conversion stage 115 converts the monitored signal by mixing in the LO signal having a frequency of between 1585 and 2470 MHz. The microprocessor 150 selects the LO frequency that corresponds to the channel frequency to be monitored. The first frequency conversion stage 115 converts the monitored signal such that the channel frequency to be monitored is centered around approximately 1580 MHz. After amplification by the first IF amplifier 116, the second frequency conversion stage 118 down-converts the up-converted monitored signal by mixing in an LO frequency of approximately 1579.925 MHz. The second frequency conversion stage 118 thus produces an IF signal in which the channel frequency to be monitored is centered around approximately 75 kHz. The second IF amplifier then adds 20 dB of gain to the IF signal and provides the amplified IF signal to the conditioning circuit 30.

In the conditioning circuit 30, the first, second and third op-amp amplifiers 120, 121, and 122 each provide a level of gain to the IF signal. As described above, the muliplexor 123 is connected to the output of each of the first, second, and third op-amp amplifiers 120, 121, and 122, and thus receives at different inputs the monitor signal amplified by: the first op-amp-amplifier 120 only; the monitored signal amplified by both the first and the second op-amp-amplifiers 120 and 121; and the monitored signal amplified by all three op-amp-amplifiers 120, 121, and 122. The microprocessor 150 causes the multiplexer 123 to provide a select one of the amplified monitored signals to the variable filter stage 140. The microprocessor 150 selects the level of amplification provided by the amplification stage in order to normalize the IF signal for measurement purposes.

The microprocessor 150 then causes the switch 127 to connect the first low pass filter 124 to the RF circuit output 128. The first low pass filter 124 effectively filters out frequency components above 95 kHz, and therefore only the down-converted and normalized version of the channel frequency of interest is provided to the RF circuit output 128.

The A/D converter 14 then samples the conditioned IF signal provided by the RF circuit output 128. In particular, the A/D converter samples the conditioned IF signal at a rate of 1 MHz lo to obtain a digitized IF signal that includes a plurality of 12-bit samples representative of the conditioned IF signal.

Leakage Detection

For leakage detection, the DSP/controller 16 causes the coupling device 26 to connect the second RF input 24, and in particular, the amplifier 107 to the frequency conversion circuit 28. The DSP/controller 16 also causes the switch 127 to connect the first low pass filter 124 to the RF circuit output 128. The RF circuit 12 receives leakage RF signal through the antenna 24a and normalizes, amplifies, filters and down-converts the leakage signals such that any detected leakage signals are converted to a normalized signal having a frequency of approximately 75 kHz. Although true leakage may occur at any frequency of the CATV spectrum, only the frequencies between 115 MHz and 140 MHz are required to be tested to determine leakage. Accordingly, the RF circuit 12 provides an output leakage signal at the RF circuit output 128 that consists of the down-converted and normalized version of the leakage signals detected by the antenna 24a that are between 115 MHz and 140 MHz.

The leakage signals are received by the antenna 24a and filtered by the bandpass filter 102. The filter 102 substantially filters out frequency components outside the 115 MHz to 140 MHz band. The amplifier 104 provides an initial 12 dB of gain and sets the noise factor of the leakage signal at 4 dB. A second bandpass filter 105 again filters out components outside of the 115 MHz and 140 MHz band ("leakage band"). The resultant filtered and amplified leakage signal then passes through the attenuator 106 which provides either no attenuation or 23 dB of attenuation, depending on the amplitude of the detected leakage signal. If the leakage signal is of relatively large magnitude, the DSP/controller 16 will cause the attenuator 106 to provide 23 dB of attenuation. If, however, the leakage signal is relatively small in magnitude, the DSP/controller 16 will cause the attenuator 106 to provide no attenuation.

In any event, the amplifier 107 thereafter provides 31 dB of amplification to the leakage signal. The leakage signal then propagates through the coupling device 26 to the frequency conversion circuit 28. The frequency conversion circuit 28 down-converts the leakage signal in the leakage band to a signal centered at approximately 75 kHz. To this end, the frequency conversion circuit 28 operates essentially in the same manner as described above in connection with signal level monitoring. The only difference in the operation of the frequency conversion circuit 28 for leakage detection is that the first and second frequency conversion stages 115 and 118 are configured to down-convert signals in the leakage band, as opposed to a select channel frequency, to the IF signal frequency.

The frequency conversion circuit 28 thus produces an IF leakage signal that comprises the down-converted leakage signal. The frequency conversion circuit 28 provides the IF leakage signal to the conditioning circuit 30, and in particular, to the amplification stage 130. The amplification stage 130, under the control of the DSP/controller 16, provides a select one of three levels of gain to the IF leakage signal. As described above in connection with monitored signals, the DSP/controller 16 selects a level of gain that will facilitate measurement and thereby provide a normalization function. The DSP/controller 16 then incorporates the s elected level of gain into its leakage detection and evaluation functions.

Once the amplification stage 130 provides the selected level of amplification, the IF leakage signal is provided to the variable filter stage 140. As discussed above, th e DSP/controller 16 ha s caused the switch 127 to connect the firs t low pass filter 124 to the RF circuit output 128. The first low pass filter 124 filters the IF leakage signal at a cut-off frequency of approximately 95. The IF leakage signal then propagates to the RF circuit output 128.

The A/D converter 14 then digitizes the conditioned IF signal provided by the RF circuit output 128. In particular, the A/D converter 14 samples the conditioned IF signal at a rate of 1 MHz to obtain a digitized IF signal that includes a plurality of 12-bit samples representative of the conditioned IF signal.

Monitored Signal Digital Measurement

Figure 5:
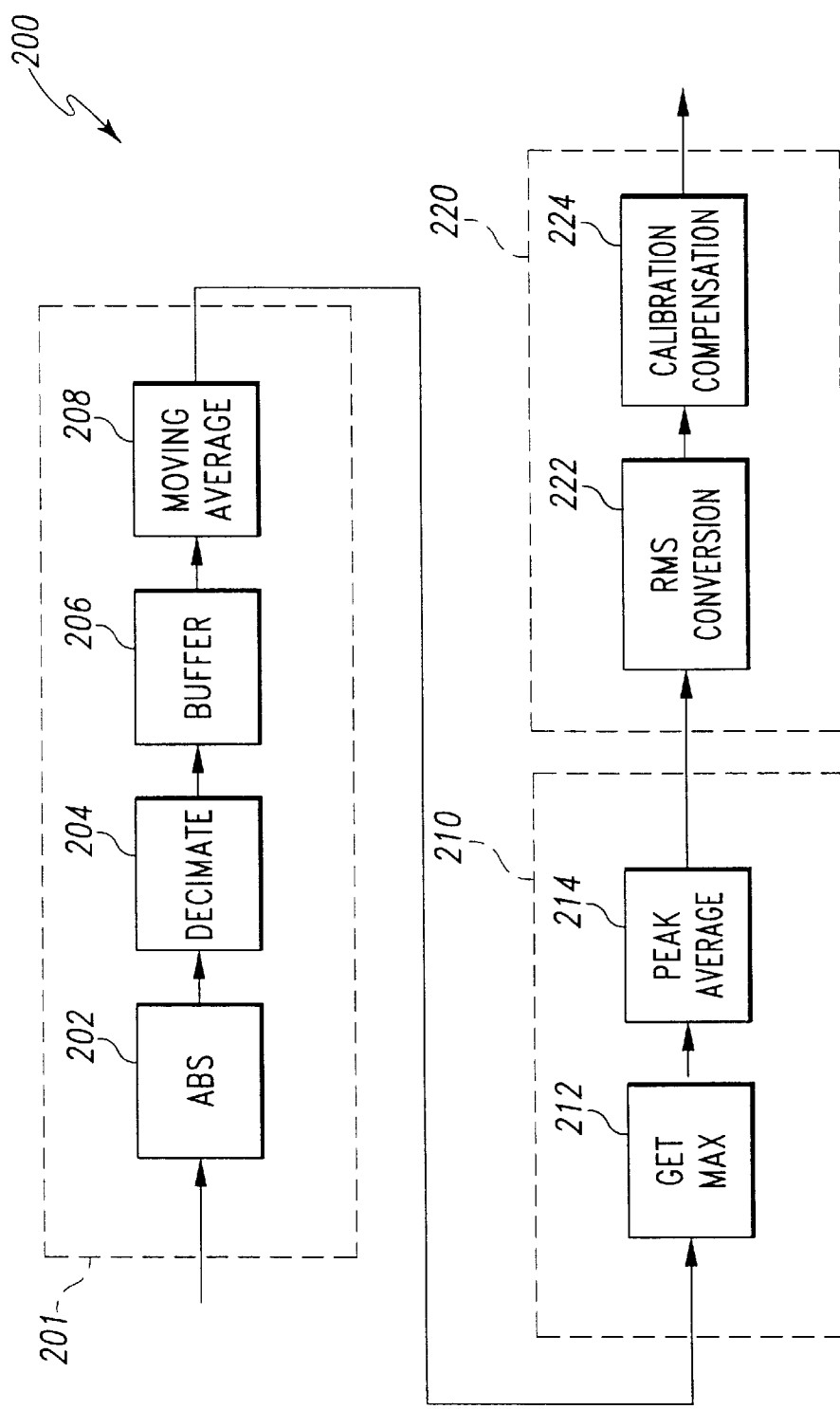
FIG. 5 shows a functional block diagram depicting how the signal level monitor of FIG. 4 obtains a signal level measurement.

FIG. 5 shows a functional block diagram of an exemplary signal level monitor 200 operable to obtain measurement for a monitored signal from a digitized representation of the monitored signal. More particularly, the signal level monitor 200 is configured to obtain a RMS value for the digitized IF signal which is a down-converted and digitized representation of the channel frequency of interest. The signal level monitor 200 includes a demodulation block 201, a pulse extraction block 210, and a signal level calculation block 220. The above-referenced functional blocks and those which follow are digital processing blocks described herein in terms of their function. It shall be noted that the operations of the various functional blocks may suitably be carried out by the DSP/controller 16 of FIG. 4, a digital signal processor, one or more field programmable gate arrays, discrete digital components, or a combination thereof.

The demodulation block 201 demodulates and decimates the digitized IF signal received from the A/D converter 14 to produce a digitized baseband signal. The digitized baseband signal, as a result of decimation, has an effective sampling rate of 50 KHz. The digitized baseband signal is a digitized representation of the television signal of interest including control information having the vertical sync pulse interval. As stated above, the vertical sync pulse interval in accord with the NTSC format has a frequency of 60 Hz.

In particular, the demodulation circuit 201 comprises the following functional blocks: an absolute value block 202, a decimation block 204, a buffer 206, and a moving average block 208. The absolute value block 202 operates to obtain the absolute value of each sample of the input 1 MHz digitized IF signal. The absolute value block 202 provides the absolute value samples to the decimation block 204. The decimation block 204 obtains the maximum sample value of each successive set of 20 adjacent absolute value samples and produces an output sample consisting of a maximum sample value for that set of samples. For example, the decimation block 204 receives sample numbers 0–19 and produces a first output sample equal to the largest sample value of those samples, then receives sample numbers 20–39 and produces a second output sample equal to the largest sample value of those samples, and so forth. As a result, the decimation block 202 produces one output sample for every 20 input samples, or one output sample for every 20 $\mu$s (microseconds). In the exemplary embodiment, the FPGA 151 is programmed to provide the functionality of the absolute value block 202 and the decimation block 204.

The decimation block 204 provides the output samples to the buffer 206. The buffer 206 stores samples for a single field of the baseband signal which is a $60^{th}$ of a second under the NTSC format. In the exemplary embodiment herein, the RAM 152 provides the storage space for the buffer 206. The buffer 206 then provides the stored output samples to the moving average block 208.

The moving average block 208 generates a running average of every 5 output samples stored in the buffer 206. For example, the moving average block 208 takes the average of samples 1–5 stored in the buffer 206, then takes the average of samples 2–6 stored in the buffer 206, and so forth. As a result, the moving average block 208 effectively provides a sample for every sample it receives from the buffer 206. The operation of the moving average block 208 effectively low pass filters the decimated digitized IF signal to reduce noise in the decimated digitized IF signal. The absolute value, decimation, and moving averaging functions of the demodulation block 201 thus operate to decimate and demodulate the digitized IF signal, thereby is producing a digitized baseband signal. As discussed above, the digitized baseband signal comprises samples having an effective sampling rate of 50 KHz which provide a digital representation of the television signal of interest.

The pulse extraction circuit 210 then receives the digitized baseband signal and generates a digitized pulse signal therefrom. The resulting digitized pulse signal comprises a series of digitized samples in which each sample represents the peak value of a vertical sync pulse in the digitized baseband signal. Specifically, the pulse extraction circuit 210 essentially extracts one sample for each vertical sync pulse interval of the digitized baseband signal. Thus, because the digitized baseband signal comprises a digital representation of the vertical sync pulse interval having a frequency of approximately 60 Hz, the pulse extraction circuit 210 generates a digitized pulse signal consisting of a 60 samples per second signal.

The pulse extraction circuit 210 includes a get maximum block 212 and an averaging block 214. The get maximum block 212 obtains the maximum sample value of one field of the digitized baseband signal. Since one field of the digitized baseband signal is a $60^{th}$ of a second and the baseband signal has a sample frequency of 50 KHz, the get maximum block 212 essentially obtains the largest sample value from each successive set of 833 adjacent moving average samples and produces a peak sample consisting of a maximum sample value for that set of samples. For example, the get maximum block 212 receives moving average sample numbers 0–832 and produces a first peak sample equal to the largest moving average sample value of those moving average samples, then receives moving average sample numbers 833–1666 and produces a second peak sample equal to the largest sample value of those moving average samples, and so forth.

As a result, the get maximum block 212 produces one peak sample for every 833 moving average samples, or one peak sample for every 16,660 $\mu$s.

The get maximum block 212 then provides the peak samples to the averaging block 214. The averaging block 214 takes the average of a predetermined number of peak samples to obtain an average peak sample. For example, the averaging block 214 receives peak sample numbers 1–10 and produces a first average peak sample having the average value of those peak samples, then receives peak sample numbers 11–20 and produces a second average peak sample having the average value of those peak samples, and so forth. As a result, the averaging block 214 produces one average peak sample for every 10 peak samples, or one average peak sample for every 166,600 $\mu$s. The averaging block 214 has the effect of further filtering the digitized baseband signal to reduce noise. Furthermore, the averaging block 214 has the effect of reducing the number and therefore the frequency of measurement value updates to the display 20. Without this reduction in the number of updates to the display 20, a technician may find it very difficult to obtain a reading from the rapidly changing display of the measurement value.

The averaging block 214 then provides the average peak samples to the calculation block 220. The calculation block 220 calculates an RMS value for each received average peak sample. In particular, the calculation block 220 multiplies a received average peak sample by a RMS conversion factor which converts the average peak sample to an RMS value, and then multiplies the RMS value by a calibration factor that adjusts the RMS value for various calibration effects such as gains or attenuations introduced by the RF circuit 12. In particular the calculation block 220 includes a RMS conversion block 222 and a calibration adjustment block 224. The RMS conversion block 222 receives an average peak sample from the averaging block 214 and multiplies the average peak sample by $$\frac{\sqrt{2}}{2}$$

(the conversion factor for a sine wave) in order to convert the average peak sample to a RMS value. The RMS conversion block 222 then provides the RMS value to the calibration adjustment block 224. The calibration adjustment block 224 Is then obtains an adjusted RMS value by multiplying the RMS value by a calibration adjustment factor that takes into account any gain or attenuation the RF circuit 12 introduced into the normalized IF signal.

The DSP/controller 16 then causes the adjusted RMS value to be displayed on the display 20. It should be noted that in the exemplary embodiment described herein the absolute value block 202 and the decimation block 204 are implemented by the FPGA 153 and the moving average block 208, the peak extraction block 210, and the calculation block 220 are implemented by the microprocessor 150.

Leakage Signal Digital Measurement

Figure 6:
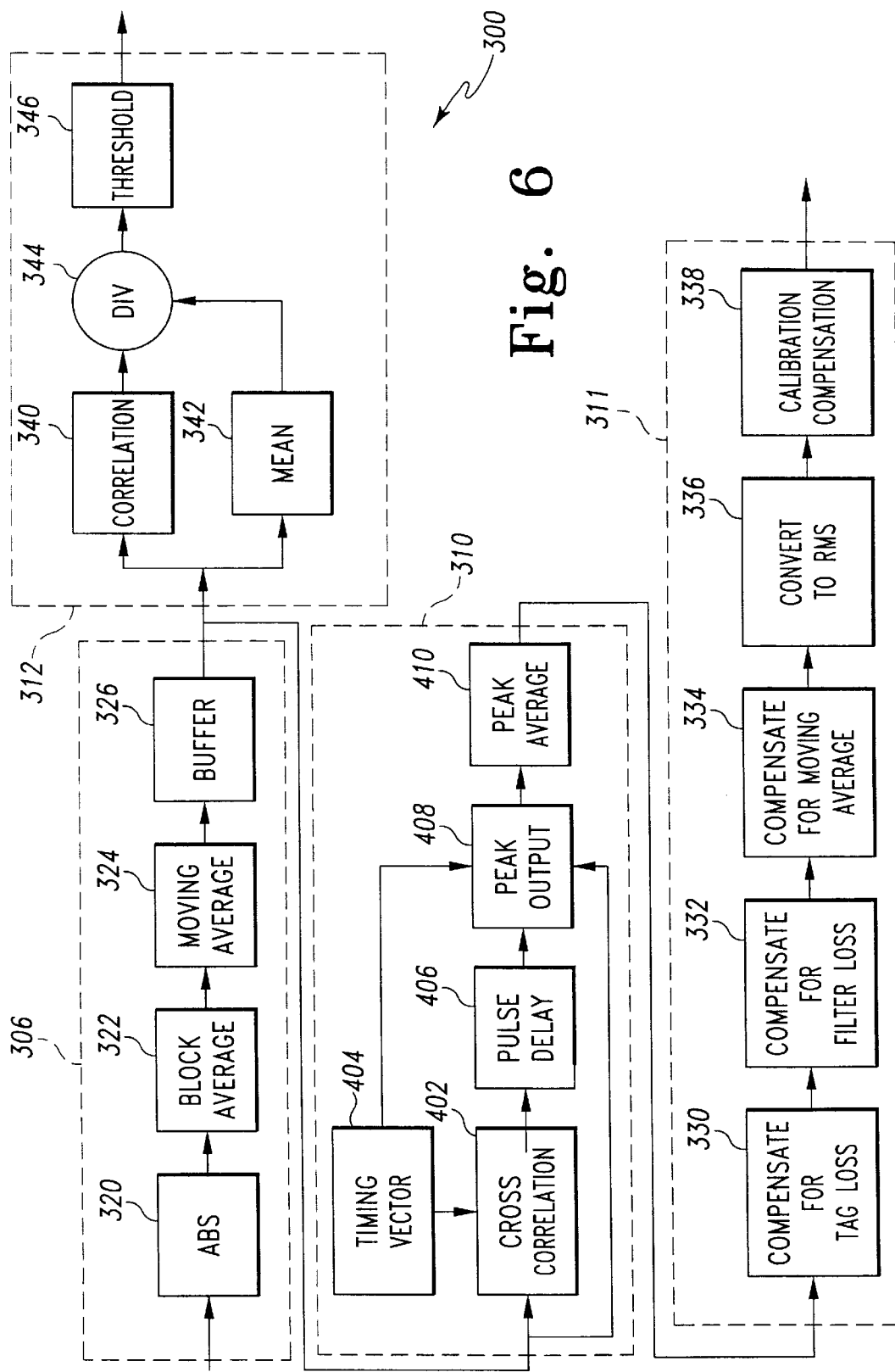
FIG. 6 shows a functional block diagram depicting how the leakage detector of FIG. 4 obtains a leakage detection measurement.

FIG. 6 shows a block diagram of an exemplary leakage detector 300 operable to detect and measure a leakage signal. More particularly, the leakage detector 300 is configured to detect and measure leakage signals in a television signal distribution subsystem, using the distinctive tagging signal to discriminate between leakage signals of the system under test and spurious RF signals generated by other sources. To this end, the leakage detector 300 measures the energy level or signal strength at the frequency on which the tagging signal has been modulated, and then determines whether the distinctive tagging signal is present.

For the purposes of describing the leakage detector 300, it is assumed that the tagging signal comprises a 10 Hz oscillating signal depth-modulated onto a television signal having a carrier frequency of 132.2625 MHz. The television signal is assumed to have a standard NTSC television signal format having control information that includes vertical intervals at a frequency of approximately 60 Hz.

The leakage detector 300 includes a digital demodulation block 306, a tag detection block 312, a pulse extraction block 310, and a leakage calculation block 311. The above-referenced functional blocks and those which follow are digital processing blocks described herein in terms of their function. It shall be noted that the operations of the various functional blocks may suitably be carried out by the DSP/controller 16 of FIG. 4, a digital signal processor, one or more field programmable gate arrays, discrete digital components, or a combination thereof.

The digital demodulation block 306 receives the digitized IF signal which includes a digital representation of the television signal having a carrier frequency of 132.2625 MHz. The digital demodulation block 306 then performs demodulation and decimation on the digitized IF signal to produce a digitized baseband signal. The digitized baseband signal, as a result of the decimation, has an effective sampling rate of approximate 3906 Hz. The digitized baseband signal is a digital representation of the television signal including the vertical sync pulse interval which occurs at a frequency of about 60 Hz.

In particular, the demodulation block 306 comprises the following functional blocks: an absolute value block 320, an averaging block 322, a moving average block 324, and a buffer 326. The absolute value block 320 operates to obtain the absolute value of each sample of the digitized IF signal received from the A/D converter 14. The absolute value block 320 then provides the absolute value samples to the averaging block 322. The averaging block 322 takes a block average of each successive set of 256 adjacent absolute value samples and produces an output sample consisting of the average value for that set of samples. For example, the averaging block 322 receives sample numbers 0–255 and produces a first output sample having the average value of those samples, then receives sample numbers 256–511 and produces a second output sample having the average value of those samples, and so forth.

As a result, the averaging block 322 produces one output sample for every 256 input samples, or one output sample for every 256 $\mu$s. The block averaging function of the averaging block 322 thus provides the decimation and the demodulation functions of the demodulation block 306. In the exemplary embodiment described herein, the FPGA 151 of FIG. 4 is programmed to implement the above absolute value block 320 and the averaging block 322.

The averaging block 322 then provides the output samples to the moving average block 324. The moving average block 324 generates a running average of every two output samples from the averaging block 322. For example, the moving average block 324 takes the average of samples 1 and 2 from the averaging block 322, then takes the average of samples 2 and 3 from the averaging block 322, and so forth. As a result, the moving average block 324 effectively produces a sample for every sample it receives from the averaging block 322. The operation of the moving average block 324 provides additional filtering to the decimated and demodulated digitized IF signal.

The moving average block 324 provides the moving average output samples to the buffer 326. The buffer 326 stores samples for several pulse periods, where pulse period is the time between two vertical sync pulse intervals in the television signal. Accordingly, in the example described herein, the pulse period is 1/60th of a second. The buffer 326 preferably stores 3906 samples which corresponds to an entire second or 60 pulse periods.

The absolute value, averaging and moving averaging functions of the demodulation block 306 thus operate to decimate and demodulate the digital IF signal, thereby producing the digitized baseband signal. As discussed above, the digitized baseband signal comprises samples having an effective sampling rate of approximately 3906 Hz which provide a digital representation of the television signal.

The pulse extraction block 310 then receives the digitized baseband signal and generates a digitized pulse signal therefrom. The resulting digitized pulse signal comprises a series of digital samples in which each sample represents the peak value of a vertical sync pulse in the digitized baseband signal. Specifically, the pulse extraction circuit 310 essentially extracts one digital baseband signal sample for each vertical sync pulse interval. Thus, because the digitized baseband signal comprises a digital representation of a television signal having a vertical sync pulse interval with a frequency of approximately 60 Hz, the pulse extraction block 310 generates a digitized pulse signal consisting of a 60 samples per second signal.

The pulse extraction block 310 includes a cross correlation block 402, a timing vector 404, a pulse delay block 406, a peak output block 408, and an averaging block 410. The timing vector 404 comprises a series of N binary samples, where N is the number of samples of the digitized baseband signal stored in the buffer 326. In the example described herein, N is the number of samples in one second, which is approximately equal to 3906. Within the series of N binary samples, every $M^{th}$ sample has a value of "1" while all other samples have a value of "0", where M is the number of samples in a pulse period. Accordingly, the timing vector 404 is essentially a series of binary samples that have a "0" value except for one sample that has a "1" value that appears every 1/60th of a second. The timing vector 404 provides such samples to the cross correlation block 402 and the peak output block 408.

It should be noted that since the vertical sync pulse interval has a frequency of 60 Hz in the NTSC system and the demodulation block 306 generates the digitized baseband signal having a sample frequency of 3906 Hz which is not an integer multiple of the frequency of the vertical sync pulse interval, the samples of the digitized baseband signal do not consistently line up with the vertical sync pulse interval. As a result, the timing vector 404 in the exemplary embodiment generates the time vector 404 to account for this misalignment. The timing vector 404 for a NTSC system may be mathematically defined by the following system of equations which account for misalignment between the sample frequency of the digitized baseband signal and the frequency of the vertical sync pulse interval:

$$T(i) = 1, \text{ if } i = 65 \times n + \text{round}\left(\frac{n}{10} + 0.51\right)$$

$$T(i) = 0; \text{ otherwise}$$

where i={0,1, . . . , 3905}, T(i) is the $i^{th}$ sample of the timing vector 404, n={0,1, . . . , 59}, and the function round(x) rounds x to the nearest integer.

To carry out the cross correlation, the cross correlation block generates cross correlation values, CX(k), for k={0,1, ..., M−1} using the following equation:

$$CX(k) = \frac{\sum_{i=0}^{N-1} S(i) \times T(i-k)}{\sum_{i=0}^{N-1} T(i)}$$

where S(i) is the (i)$^{th}$ sample of the N samples of digitized baseband signal received from the buffer 326, and where T(i−k) is defined by the following system of equations:

$$T(i-k) = \begin{cases} T(i-k) & \text{if } i \geq k \\ T(i-k+N) & \text{if } i < k \end{cases}$$

where T(i−k) is the (i−k)th sample of the timing vector 404, and T(i−k+N) is the (i−k+N)$^{th}$ sample of the timing vector 404.

The cross-correlation block 402 provides the CX(k) values to the pulse delay block 406. The pulse delay block 406 identifies the maximum CX(k) value, and provides the k-value of that maximum to the peak output block 408. The k-value represents the phase delay between the "1" samples in the timing vector 404 and the pulses in the digital baseband signal.

The peak output block 408 also receives the N digital baseband signal samples and the timing vector 404. Using the timing vector 404 for pulse frequency information, and the k-value is as the pulse phase information, the peak output block 408 provides as output a single pulse sample from the digital baseband signal for each vertical sync pulse interval occurring therein. For a NTSC system, all the vertical sync pulse interval peaks are the following samples:

$$S(i); i = 65 \times n + \text{round}\left(\frac{n}{10} + 0.51\right) + k^*$$

where i={0,1, . . . , 3905}, S(i) is the i$^{th}$ sample of the N samples of the digitized baseband signal received from the buffer 326, n={0,1, . . . , 59}, the function round(x) rounds x to the nearest integer, and k* is the k-value provided by the pulse delay block 406. As a result, the peak output block 408 generates a digital pulse signal comprising N/M output samples for each N samples of the digitized baseband signal. As mentioned above, in the example described herein, the digital pulse signal comprises 60 samples per second.

The peak output block 408 then provides the digitized pulse signal to the averaging block 410. The averaging block 410 takes the average of all of the pulse samples of the digitized pulse signal corresponding to a seconds worth of digitized baseband signals. In particular, the averaging block 410 averages the 60 peak samples obtained by the peak output block 408 applying the above S(i) equation to the N samples of the digitized baseband signal. Since the average of the peak samples is equal to CX(k*), the cross correlation block 402, the timing vector 404, the peak output block 408, and the averaging block 410 in the exemplary embodiment are combined into one software routine that is executed by the microprocessor 150.

It should be noted that the averaging block 410 effectively filters out the tagging signal that had been depth-modulated onto the leakage signal. It should also be noted that in order to accurately remove the tagging signal the averaging block 410 needs to average pulse samples corresponding to an integer multiple of the tagging signal's cycle. Since the tagging signal as described herein may be between 3 Hz and 20 Hz at one 1 Hz increments, a seconds worth of samples ensures that the averaging block 410 will average pulse samples corresponding to an integer multiple of the tagging signal's cycle.

The resulting average peak sample is then provided to the leakage calculation block 311. The leakage calculation block 311 calculates an RMS value for the average peak sample. In particular, the leakage calculation block 311 compensates the average peak sample for tag loss, compensates the tag compensated peak sample for filter loss, converts the filter compensated peak sample to an RMS value, and compensates the RMS value for various calibration effects. To this end, the leakage calculation block 311 a tag compensation block 330, a filter compensation block 332, a moving average compensation block 334, a RMS conversion block 336, and a calibration adjustment block 338.

The tag compensation block 330 compensates the average peak sample for loss due to the tagging signal being depth-modulated onto the television signal. The average peak sample may be represented by $S_{AP}=V_P(1-A)$ where $S_{AP}$ is the average peak sample, $V_P$ is the true peak level, and A is the amplitude of the tagging signal. While A could be determined during leakage detection, the signal-to-noise ratio is usually so low that too much error would be introduced into the calculation. As a result, in the exemplary embodiment described herein, the combined monitor/detector 10 is periodically coupled directly to the transmission subsystem 3 in order to obtain a measurement of A and a tag compensation factor of $(1-A)^{-1}$. The tag compensation block 330 then may later compensate average peak samples by multiplying the average peak samples by the tag compensation factor. It should be noted that the combined monitor/detector 10 may obtain a new tag compensation factor from the transmission subsystem 3 relatively infrequently since the value of A typically does not change appreciably over time.

The tag compensation block 330 then provides the tag compensated peak sample to the filter compensation block 332. The filter compensation block 332 adjusts the tag compensated peak sample for loss attributable to the averaging block 322. The 256 sample average performed by the averaging block 322 on the digitized IF signal is equivalent to a simple discrete integration of the digitized IF signal. Assuming the digitized IF signal is a continuous wave of unit amplitude, the effect of the averaging block 322 is the same as integrating the continuous wave over half of its period which results in a value of $$\frac{2}{\pi}.$$

Thus, the averaging block 322 reduces the tag compensated peak sample by a factor of $$\frac{2}{\pi}.$$

As a result, the filter compensation block 332 multiplies the tag compensated peak sample by $$\frac{2}{\pi}$$

in order to compensate the tag compensated peak-value for the loss due to the averaging block 322.

The filter compensation block 332 provides the filter compensated peak value to the moving average compensation block 334. The moving average compensation block 334 adjusts the filter compensated peak value for loss attributable to the moving average block 324. The moving average block 324 takes a two point moving average of the samples received from the averaging block 322. Since the averaging block 322 decimates the digitized IF signal by 256 samples, the moving average block in effect averages 512 samples of the digitized IF signal or 512 $\mu$s of the television signal. As stated above, the vertical sync pulse interval is only 192 $\mu$s long. As a result, the averaging will include the equalizing pulse intervals of the vertical interval which is lower in level than the vertical sync pulse interval level, and thus will yield a lesser value than the peak of the vertical sync pulse interval. The equalizing interval (ignoring the equalizing pulses that are removed by the averaging block 322) has a base which is 75% of the vertical sync pulse interval peak. Therefore, assuming the peak is of unit value, the average will yield:

$$\frac{192 + 0.75 \times (512 - 192)}{512} = 0.84375$$

Therefore, the moving average compensation factor is $(0.84375)^{-1}$ or 1.1852. The moving average compensation block 334, therefore, compensates the filter compensated peak sample by multiplying the filter compensated peak sample received from the filter compensation block 332 by the moving average compensation factor of 1.1852.

The moving average compensation block 334, then provides the resulting moving average compensated peak sample to the RMS conversion block 336. The RMS conversion block 336 determines a RMS value for the compensated peak sample by multiplying the compensated peak sample by a $\sqrt{2}2$ (the conversion factor for a sine wave) in order to convert the compensated peak sample to a RMS value. The RMS conversion block 336 then provides the RMS value to the calibration adjustment block 338. The calibration adjustment block 338 then obtains an adjusted RMS value by multiplying the RMS value by a calibration adjustment factor that takes into account any gain or attenuation the RF circuit 12 introduced into the normalized IF signal.

The DSP/controller 16 then causes the adjusted RMS value to be displayed on the display 20. It should be noted that in the exemplary embodiment described herein the absolute value block 320 and the averaging block 322 are implemented by the FPGA 151 and the moving average block 324, the peak extraction block 310, and the leakage level calculation block 311 are implemented by the microprocessor 150.

The tag detection block 312 generates a tag present signal if the tagging signal is present in the digitized IF signal. To this end, the tag detection block 312 generates a $f_{tag}$ component relative to the pulse peak amplitude, or simply relative $f_{tag}$ component, where $f_{tag}$ is the frequency of the inserted tagging signal. The relative $f_{tag}$ component is representative of the tag amplitude, A, generated within the tagging signal generator 7 of FIG. 1. In general, the relative $f_{tag}$ component identifies whether the digitized IF signal includes a tagging signal generated by the CATV system 2.

Accordingly, in the example described herein, the tag detection block 312 generates a relative 10 Hz component value. Because the tagging signal is 3 dB depth-modulated onto the television signal, as discussed above, the relative 10 Hz component should be approximately 0.09. The tag detection block 312 then compares the relative $f_{tag}$ component to a threshold level and if it has a predetermined relationship to the threshold value, the tag detection block 312 generates a tag present signal.

To carry out the above described functions, the tag detection block 312 preferably includes a correlation block 340, a mean block 342, a division block 344, and a threshold block 346. The correlation block 340 receives the digitized baseband signal from the demodulation block 306. The correlation block 340 then generates a measurement of the relative $f_{tag}$ component of the digitized baseband signal. In this embodiment, the correlation block 340 generates a correlation factor ("CF"). To this end, the correlation block 340 carries out the following equation using the appropriate digital signal processing functions:

$$CF = \sqrt{\left(\frac{\sum_{i=1}^{N} z(i) c(i)}{N}\right)^2 + \left(\frac{\sum_{i=1}^{N} z(i) s(i)}{N}\right)^2}$$

where i is a sample index, $z(i)$ is the $i^{th}$ sample of the digitized baseband signal stored in the buffer, $c(i)=\cos(2\pi \cdot f_{tag} \cdot \tau \cdot i)$, $s(i)=\sin(2\pi \cdot f_{tag} \cdot \tau \cdot i)$, where $f_{tag}$ is the tag frequency of 10 Hz, $\tau$ is the effective sampling period, and N is the number of samples representing one second of the digitized baseband signal. In the exemplary embodiment the cosine wave and sine wave samples of $c(i)$ and $s(i)$ respectively are generated off-line and stored in the nonvolatile memory 153 for later reference. If the tagging signal having the frequency $f_{tag}$ is present in the digitized baseband signal then the CF will equal VA/2 where A is the relative $f_{tag}$ component and V is a scalar proportional to the level of the digitized baseband signal; otherwise the CF will equal a very small number if N is sufficiently large.

Contemporaneously, the mean block 342 generates the mean over N samples of the digitized baseband signal. It can be shown that the resulting mean block output value is equal to V(1−A). The division block 344 then divides the CF value obtained from the correlation block 340 by the mean value of the mean block 342 in order to obtain a tag ratio that relates the detected tagging signal level to the level of the digitized baseband signal. The resulting value equals $$\frac{A}{2(1-A)}$$

which is referred to as the tag ratio.

The division block 344 provides the tag ratio to the threshold block 346. The threshold block 346 determines from the level of the tag ratio whether the tagging signal is present in the digitized baseband signal. In particular, the threshold block 346 compares the tag ratio to a lower limit and an upper limit and generates a tag present signal if the tag ratio is between the two limits. For a typical 3 dB depth-modulated tagging signal, the tag ratio equals 0.09, and allowing for a 2 dB variation on the tag modulation, the tag ratio varies between 0.02 to 0.14. As a result, the threshold block 346 in the exemplary embodiment described herein generates the tag present signal if the tag ratio is between 0.02 and 0.14. It should be noted that generating a tag ratio that relative to the level of the digitized baseband signal instead of simply generating a tag ratio that is indicative of the level of the tagging signal reduces false detections that result from digitized baseband signal having a high signal level. Furthermore, it should be noted that by generating a tag ratio averaged over one second of samples the tag detection circuit 312 reduces noise in the digitized baseband signal that may lead to false detections. The longer the period of time the tag ratio is averaged over the less susceptible the tag detection block 312 is to noise; however, since leakage detection is required to work in an environment where a technician is driving in a vehicle at a rate of 45 miles per hour even one second of samples corresponds to 20 meters. Therefore, a tradeoff is made between tag detection susceptibility and pinpointing location of a leakage signal.

In either event, the DSP/controller 16 displays the determined RMS value for the leakage signal and displays an indication of whether the tagging signal is present. As a result, the technician is provided a display that shows a measurement of the leakage signal which in turn is indicative of the signal level energy detected in the frequency band around 132.2625 MHz, and an indication of whether that signal level energy is attributable to the leakage signal being tagged by the tagging signal generator 7 within the transmission subsystem 3.

The leakage detector 300 thus provides a means by which leakage signals which have been tagged in accordance with the present invention may be detected. Spurious signals from other cable systems are distinguished such that the leakage detection is truly directed toward leakage from the system under test.

It will be appreciated that the above descriptions and embodiment are given by way of example only. Those of ordinary skill in the art may readily devise their own implementations that incorporate the features of the present invention and fall within the spirit and scope thereof. For example, the specific circuit elements and arrangement of circuit elements discussed above in connection with FIG. 4 are given by way of example only and may readily be reconfigured by those of ordinary skill in the art to provide the inventive features.

What is claimed is:

1. A method of obtaining a measurement value representative of a signal level of a RF signal that includes a carrier signal modulated with (i) program information and (ii) control information, comprising the steps of:

generating from the RF signal a digitized RF signal that is a digital representation of the carrier signal modulated with (i) the program information and (ii) the control information, said control information including a plurality of synchronization pulses; and determining from one more synchronization pulses within the control information the measurement value that is representative of the signal level of the RF signal, said determining further comprising obtaining from the digitized RF signal a pulse value that represents a magnitude of a synchronization pulse of the plurality of synchronization pulses, and determining the measurement value from the pulse value.

2. The method of claim 1, wherein the determining step includes the steps of:

obtaining from the digitized RF signal a first pulse value that represents a magnitude of a first synchronization pulse of the plurality of synchronization pulses, obtaining from the digitized RF signal a second pulse value that represents a magnitude of a second synchronization pulse of the plurality of synchronization pulses, averaging the first pulse value and the second pulse value to obtain an average pulse value, and determining the measurement value from the average pulse value.

3. The method of claim 1, wherein the digitized RF signal comprises a plurality of intervals and wherein:

the generating step includes the step of obtaining a plurality of values from the digitized RF signal, each value of the plurality of values indicative of a maximum magnitude of the digitized RF signal over a separate interval of the digitized RF signal, and the determining step includes the steps of (a) setting a pulse value for the digitized RF signal equal to a maximum value of the plurality of values, and (b) determining the measurement value from the pulse value.

4. The method of claim 1, wherein the step of determining includes the steps of:

correlating the digitized RF signal with a predetermined signal pattern in order to obtain a plurality of pulse values from the digitized RF signal, each pulse value indicative of a magnitude of a separate synchronization pulse of the plurality of synchronization pulses, obtaining an average pulse value for the plurality of pulse values, and determining the measurement value from the average pulse value.

5. The method of claim 1, wherein:

the generating step includes the step of obtaining a plurality of values, each value of the plurality of values indicative of an average magnitude of the digitized RF signal over a separate interval of the digitized RF signal, and the determining step includes the steps of (a) obtaining a pulse value from the plurality of values, (b) adjusting the pulse value to obtain an adjusted pulse value that has been compensated for loss due to the generating step, and (c) determining the measurement value from the adjusted pulse value.

6. The method of claim 1 further including the step of frequency converting a first RF signal to generate the RF signal prior to generating the digitized RF signal from the RF signal.

7. A method of obtaining a measurement value representative of a signal level of a RF signal that includes a baseband signal modulated onto a first carrier signal having a first frequency, wherein the baseband signal includes (i) program information and (ii) control information, comprising the steps of:

converting the RF signal to an IF signal comprising the baseband signal modulated onto a second carrier signal of a second frequency, the IF signal including (i) the program information of the baseband signal and (ii) the control information of the baseband signal;

sampling the IF signal to obtain a digitized IF signal that is a digital representation of the baseband signal modulated onto the second carrier signal, the digitized IF signal including a first digital representation of (i) the program information of the baseband signal and (ii) the control information of the baseband signal;

demodulating the digitized IF signal to obtain a digitized baseband signal that is a digital representation of the baseband signal, the digitized baseband signal including a second digital representation of (i) the program information of the baseband signal and (ii) the control information of the baseband signal; and determining from the digitized baseband signal the measurement value that is representative of the signal level of the RF signal.

8. The method of claim 7, wherein the control information includes a plurality of synchronization pulses and the determining step includes:

determining from one or more synchronization pulses within the control information the measurement value.

9. The method of claim 8, further comprising the step of:

signaling presence of a tagging signal in the RF signal if the tagging signal is present in the digitized baseband signal.

10. The method of claim 8, wherein the signaling step includes the steps of:

correlating the digitized baseband signal with the tagging signal to obtain a correlation magnitude that is indicative of extent of the tagging signal being present in the digitized baseband signal, and determining that the tagging signal is present in the digitized baseband signal if the correlation magnitude has a predetermined relationship to a threshold value.

11. The method of claim 8, wherein the demodulating step includes the step of:

taking absolute value of the digitized IF signal to obtain the digitized baseband signal.

12. The method of claim 8, wherein the determining step includes the steps of:

obtaining from the digitized baseband signal a pulse value that represents a magnitude of a synchronization pulse of the plurality of synchronization pulses, and determining the measurement value from the pulse value.

13. The method of claim 8, wherein the determining step includes the steps of:

obtaining from the digitized baseband signal a first pulse value that represents a magnitude of a first synchronization pulse of the plurality of synchronization pulses, obtaining from the digitized baseband signal a second pulse value that represents a magnitude of a second synchronization pulse of the plurality of synchronization pulses, averaging the first pulse value and the second pulse value to obtain an average pulse value, and determining the measurement value from the average pulse value.

14. The method of claim 8, wherein:

the generating step includes the step of obtaining a plurality of values from the digitized baseband signal, each value of the plurality of values indicative of a maximum magnitude of the digitized baseband signal over a separate interval of the digitized baseband signal, and the determining step includes the steps of (a) setting a pulse value for the digitized baseband signal to a maximum value of the plurality of values, and (b) determining the measurement value from the pulse value.

15. The method of claim 8, wherein the step of determining includes the steps of:

correlating the digitized baseband signal with a predetermined signal pattern in order to obtain a plurality of pulse values from the digitized baseband signal, each pulse value indicative of a magnitude of a separate synchronization pulse of the plurality of synchronization pulses, obtaining an average pulse value for the plurality of pulse values, and determining the measurement value from the average pulse value.

16. The method of claim 8, wherein the determining step includes the steps of:

obtaining a maximum amplitude value for the digitized baseband signal over a predetermined interval, the maximum amplitude value indicative of a magnitude of a synchronization pulse of the plurality of synchronization pulses, and determining the measurement value from the maximum amplitude value.

17. The method of claim 8, wherein the determining step includes the steps of:

obtaining a maximum amplitude value for the digitized baseband signal over a predetermined interval, the maximum amplitude value indicative of a magnitude of a synchronization pulse of the plurality of synchronization pulses, and multiplying the maximum amplitude value by a predetermined constant to obtain the measurement value.

18. The method of claim 8, wherein:

the generating step includes the step of obtaining a plurality of values, each value of the plurality of values indicative of an average magnitude of the digitized baseband signal over a separate interval of the digitized baseband signal, and the determining step includes the steps of (a) obtaining a pulse value from the plurality of values, (b) adjusting the pulse value to obtain an adjusted pulse value that has been compensated for loss due to the generating step, and (c) determining the measurement value from the adjusted pulse value.

19. The method of claim 8, further comprising the step of:

receiving the RF signal through a cable connector.

20. The method of claim 8, further comprising the step of:

receiving the RF signal through an antenna.

21. A measurement device for obtaining a measurement value representative of a signal level of a RF signal that includes a carrier signal modulated with (i) program information and (ii) control information, comprising:

a RF input configured to receive said RF signal;

an analog-to-digital (A/D) converter coupled to said RF input and configured to (a) receive said RF signal from said RF input and (b) sample said RF signal to obtain a digitized RF signal that is a digital representation of said carrier signal modulated with (i) said program information and (ii) said control information; and a digital signal processing circuit coupled to said A/D converter and configured to (a) receive said digitized RF signal from said A/D converter and (b) determine from said control information included in said digitized RF signal a measurement value that is representative of said signal level of a portion of said RF signal that includes substantially only the control information.

22. The measurement device of claim 21, wherein the control information includes a plurality of synchronization pulses and wherein:

the digital signal processing circuit is further configured to determine from one or more synchronization pulses within the control information the measurement value.

23. The measurement device of claim 22, wherein said digital signal processing circuit comprises:

a pulse extractor coupled to said A/D converter and configured to (a) receive said digitized RF signal from said A/D converter and (b) obtain from said digitized RF signal a pulse value that represents a magnitude of a synchronization pulse of said digitized RF signal; and a signal level calculator coupled to said pulse extractor and configure to (a) receive said pulse value from said pulse extractor and (b) determine said measurement value from said pulse value.

24. The measurement device of claim 22, wherein said digital signal processing circuit comprises:

a pulse extractor coupled to said A/D converter and configured to (a) receive said digitized RF signal from said A/D converter, (b) obtain from said digitized RF signal a first pulse value that represents a magnitude of a first synchronization pulse of said plurality of synchronization pulses, and (c) obtain from said digitized RF signal a second pulse value that represents a magnitude of a second synchronization pulse of said plurality of synchronization pulses, a pulse filter coupled to said pulse extractor and configured to (a) receive said first pulse value and said second pulse value from said pulse extractor, and (b) average said first pulse value and said second pulse value to obtain an average pulse value a signal level calculator coupled to said pulse filter and configured to (a) receive said average pulse value from said pulse filter, and (b) determine said measurement value from said average pulse value.

25. The measurement device of claim 22, wherein said digital signal processing circuit comprises:

a pulse extractor coupled to said A/D converter and configured to (a) obtain a plurality of values from said digitized RF signal, each value of said plurality of values indicative of a maximum magnitude of said digitized RF signal over a separate interval of said digitized RF signal, and (b) set a pulse value for said digitized RF signal equal to a maximum value of the plurality of values, and a signal determiner coupled to said pulse extractor and configured to (a) receive said pulse value from said pulse extractor, and (b) determine the measurement value from said pulse value.

26. The measurement device of claim 22, wherein said digital signal processing circuit comprises:

a pulse extractor coupled to said A/D converter and configured to correlate the digitized RF signal with a predetermined signal pattern in order to obtain a plurality of pulse values from said digitized RF signal, each pulse value indicative of a magnitude of a separate synchronization pulse of said plurality of synchronization pulses, and a pulse filter coupled to said pulse extractor and configured to (a) receive said plurality of pulse values from said pulse extractor, and (b) obtain an average pulse value for said plurality of pulse values, a signal level calculator coupled to said pulse filter and configured (a) to receive said plurality of pulse values from said pulse filter, and (b) determine said measurement value for said average pulse value.

27. The measurement device of claim 22, wherein said digital signal processing circuit comprises:

a pulse extractor coupled to said A/D converter and configured to (a) obtain a maximum amplitude value for said digitized RF signal over a predetermined interval, said maximum amplitude value indicative of a magnitude of a synchronization pulse of the plurality of synchronization pulses, and a signal level calculator coupled to said A/D converter and configured to (a) receive said maximum amplitude value from said pulse extractor, and (b) determine said measurement value from said maximum amplitude value.

28. The measurement device of claim 22, wherein said digital signal processing circuit comprises:

a pulse extractor coupled to said A/D converter and configured to (a) receive said digitized RF signal from said A/D converter, and (b) obtain a maximum amplitude value for said digitized RF signal over a predetermined interval, said maximum amplitude value indicative of a magnitude of a synchronization pulse of said plurality of synchronization pulses, and a signal level calculator coupled to said pulse extractor and configured to (a) receive said maximum amplitude value, and (b) multiply said maximum amplitude value by a predetermined constant to obtain said measurement value.

29. The measurement device of claim 22, wherein said digital signal processing circuit comprises:

a pulse extractor coupled to said A/D converter and configured to (a) receive said digitized RF signal from said A/D converter, (b) obtain a plurality of values from said digitized RF signal, each value of the plurality of values indicative of an average magnitude of said digitized RF signal over a separate interval of said digitized RF signal, and (c) obtain a pulse value from said plurality of values, and a signal level calculator coupled to said pulse extractor and configured to (a) receive said pulse value from said pulse extractor, (b) adjust said pulse value to obtain an adjusted pulse value that has been compensated for loss due to said pulse extractor, and (c) determine said measurement value from said adjusted pulse value.

30. The measurement device of claim 22, wherein said digital signal processing circuit comprises:

a tag detector coupled to said A/D converter and configured to (a) receive said digitized RF signal from said A/D converter, and (b) signal presence of a tagging signal in said RF signal if said tagging signal is present in said digitized RF signal.

31. The measurement device of claim 22, wherein said digital signal processing circuit comprises:

a tag detector coupled to said A/D converter and configured to (a) receive said digitized RF signal from said A/D converter, (b) correlate said digitized RF signal with a tagging signal to obtain a correlation magnitude that is indicative of extent of said tagging signal being present in said digitized RF signal, and (c) signal presence of said tagging signal in said RF signal if said correlation magnitude has a predetermined relationship to a threshold value.

32. The measurement device of claim 22, wherein said digital signal processing circuit comprises:

a pulse extractor coupled to said A/D converter and configured to (a) receive said digitized RF signal from said A/D converter, and (b) obtain a plurality of pulse values from said digitized RF signal, each pulse value indicative of a magnitude of a separate synchronization pulse of said plurality of synchronization pulses, a tag detector coupled to said A/D converter and configured to (a) receive said digitized RF signal from said A/D converter, and (b) signal presence of a tagging signal in said RF signal if said tagging signal is present in said digitized RF signal, a pulse filter coupled to said pulse extractor and configured to (a) receive said plurality of pulse values, and (b)

average said plurality of pulse values to obtain an average pulse value, and a signal level calculator coupled to said pulse filter and configure to (a) receive said average pulse value from said pulse filter, (b) compensate said average pulse value to obtain a compensated pulse value that is adjusted for loss due to said tagging signal, and (d) determine said measurement value from said compensated pulse value.

33. The measurement device of claim 21, wherein the control information includes a plurality of synchronization pulses and wherein:

the digital signal processing circuit is further configured to determined from one or more synchronization pulses within the control information the measurement value.

34. A measurement device for obtaining a measurement value representative of a signal level of a RF signal that includes a baseband signal modulated onto a first carrier signal having a first frequency, wherein said baseband signal includes (i) program information and (ii) control information, comprising:

a RF input configured to receive said RF signal;

a frequency conversion circuit coupled to said RF input and configured to convert said RF signal to an IF signal comprising said baseband signal modulated onto a second carrier signal of a second frequency, said IF signal including (i) said program information of said baseband signal and (ii) said control information of said baseband signal;

an analog-to-digital (A/D) converter coupled to said frequency conversion circuit and configured to (a) receive said IF signal from said frequency conversion circuit, and (b) sample said IF signal to obtain a digitized IF signal comprising a first plurality of digital values representative of said baseband signal modulated onto said second carrier signal, said first plurality of digital values also representative of (i) said program information of said baseband signal and (ii) said control information of said baseband signal;

a digital signal processing circuit coupled to said A/D converter and configured to (a) receive said digitized IF signal from said A/D converter, (b) demodulate said digitized IF signal to obtain a digitized baseband signal comprising a second plurality of digital values representative of said baseband signal, said second plurality of digital values also representative of (i) said program information of said baseband signal and (ii) said control information of said baseband signal, and (c) determine from said control information included in said digitized baseband signal said measurement value that is representative of said signal level of said RF signal.

35. The measurement device of claim 34, wherein the control information includes a plurality of synchronization pulses and wherein:

the digital signal processing circuit is further configured to determine from one or more synchronization pulses within the control information the measurement value.

36. The measurement device of claim 35, wherein said digital signal processing circuit comprises:

a pulse extractor configured to (a) receive said digitized baseband signal and (b) obtain from said digitized baseband signal a pulse value that represents a magnitude of a synchronization pulse of said digitized baseband signal; and a signal level calculator coupled to said pulse extractor and configure to (a) receive said pulse value from said pulse extractor and (b) determine said measurement value from said pulse value.

37. The measurement device of claim 35, wherein said digital signal processing circuit comprises:

a pulse extractor configured to (a) receive said digitized baseband signal, (b) obtain from said digitized baseband signal a first pulse value that represents a magnitude of a first synchronization pulse of said plurality of synchronization pulses, and (c) obtain from said digitized baseband signal a second pulse value that represents a magnitude of a second synchronization pulse of said plurality of synchronization pulses, a pulse filter coupled to said pulse extractor and configured to (a) receive said first pulse value and said second pulse value from said pulse extractor, and (b) average said first pulse value and said second pulse value to obtain an average pulse value, and a signal level calculator coupled to said pulse filter and configured to (a) receive said average pulse value from said pulse filter, and (b) determine said measurement value from said average pulse value.

38. The measurement device of claim 35, wherein the digital signal processing circuit includes:

a decimator coupled to said A/D converter and configured to (a) receive said digitized IF signal from said A/D converter, and (b) decimate said digitized IF signal to obtain said digitized baseband signal, wherein each digital value of said digitized baseband signal is a maximum digital value of said digitized IF signal over a separate interval of digital values of said digitized IF signal, a pulse extractor coupled to said decimator and configured to (a) receive said digitized baseband signal, and (b) determine from said digitized baseband signal a pulse value that is indicative of a synchronization pulse of said plurality of synchronization pulses, and a signal calculator coupled to said pulse extractor and configured to (a) receive said pulse value from said pulse extractor, and (b) determine the measurement value from said pulse value.

39. The measurement device of claim 35, wherein said digital signal processing circuit comprises:

a pulse extractor configured to (a) receive said digitized baseband signal and (b) correlate said digitized baseband signal with a predetermined signal pattern in order to obtain a plurality of pulse values from said digitized baseband signal, each pulse value indicative of a magnitude of a separate synchronization pulse of said plurality of synchronization pulses, a pulse filter coupled to said pulse extractor and configured to (a) receive said plurality of pulse values from said pulse extractor, and (b) obtain an average pulse value from said plurality of pulse values, and a signal level calculator coupled to said pulse filter and configure to (a) receive said average pulse value from said pulse filter, and (b) determine said measurement value from said average pulse value.

40. The measurement device of claim 35, wherein said digital signal processing circuit comprises:

a pulse extractor configured to (a) receive said digitized baseband signal, and (b) obtain a maximum amplitude value for said digitized baseband signal over a predetermined interval, said maximum amplitude value indicative of a magnitude of a synchronization pulse of the plurality of synchronization pulses, and a signal level calculator coupled to said pulse extractor and configured to (a) receive said maximum amplitude value from said pulse extractor, and (b) determine said measurement value from said maximum amplitude value.

41. The measurement device of claim 35, wherein said digital signal processing circuit comprises:
 a pulse extractor configured to (a) receive said digitized baseband signal, and (b) obtain a maximum amplitude value for said digitized RF signal over a predetermined interval, said maximum amplitude value indicative of a magnitude of a synchronization pulse of said plurality of synchronization pulses, and
 a signal level calculator coupled to said pulse extractor and configured to (a) receive said maximum amplitude value, and (b) multiply said maximum amplitude value by a predetermined constant to obtain said measurement value.

42. The measurement device of claim 35, wherein said digital signal processing circuit comprises:
 a pulse extractor configured to (a) receive said digitized baseband signal, (b) obtain a plurality of values from said digitized baseband signal, each value of the plurality of values indicative of an average magnitude of said digitized RF signal over a separate interval of said digitized baseband signal, and (c) obtain a pulse value from said plurality of values, and
 a signal level calculator coupled to said pulse extractor and configured to (a) receive said pulse value from said pulse extractor, (b) adjust said pulse value to obtain an adjusted pulse value that has been compensated for loss due to said pulse extractor, and (c) determine said measurement value from said adjusted pulse value.

43. The measurement device of claim 35, wherein said RF input comprises:
 a cable connector configured to detachably couple to a cable and to receive said RF signal from said cable if said cable is coupled to said cable connector.

44. The measurement device of claim 35, wherein said RF input comprises:
 an antenna configured to receive said RF signal.

45. The measurement device of claim 35, wherein said digital signal processing circuit comprises:
 a tag detector configured to (a) receive said digitized baseband signal, and (b) signal presence of a tagging signal in said RF signal if said tagging signal is present in said digitized RF signal.

46. The measurement device of claim 35, wherein said digital signal processing circuit comprises:
 a tag detector configured to (a) receive said digitized baseband signal, (b) correlate said digitized baseband signal with a tagging signal to obtain a correlation magnitude that is indicative of extent of said tagging signal being present in said digitized baseband signal, and (c) signal presence of said tagging signal in said RF signal if said correlation magnitude has a predetermined relationship to a threshold value.

47. The measurement device of claim 35, wherein said digital signal processing circuit comprises:
 a pulse extractor configured to (a) receive said digitized baseband signal, (b) obtain a plurality of pulse values from said digitized baseband signal, each pulse value indicative of a magnitude of a separate synchronization pulse of said plurality of synchronization pulses,
 a tag detector configured to (a) receive said digitized baseband signal, and (b) signal presence of a tagging signal in said RF signal if said tagging signal is present in said digitized baseband signal,
 a pulse filter coupled to said pulse extractor and configured to (a) receive said plurality of pulse values, (b) average said plurality of pulse values to obtain an average pulse value, and
 a signal level calculator coupled to said pulse filter and configure to (a) receive said average pulse value from said pulse filter, (b) compensate said average pulse value to obtain a compensated pulse value that is compensated for loss due to said tagging signal, and (d) determine said measurement value from said compensated pulse value.

48. A method of obtaining a measurement value representative of a signal level of a RF signal that includes a carrier signal modulated with (i) program information and (ii) control information, comprising the steps of:
 generating from the RF signal a digitized RF signal that is a digital representation of the carrier signal modulated with (i) the program information and (ii) the control information, and
 determining from the control information the measurement value that is representative of the signal level of a portion of the RF signal that includes substantially only the control information.

49. The method of claim 44, further comprising the step of:
 signaling presence of a tagging signal in the RF signal if the tagging signal is present in the digitized RF signal.

50. The method of claim 49, wherein the signaling step includes the steps of:
 correlating the digitized RF signal with the tagging signal to obtain a correlation magnitude that is indicative of extent of the tagging signal being present in the digitized RF signal, and
 determining that the tagging signal is present in the digitized RF signal if the correlation magnitude has a predetermined relationship to a threshold value.

51. The method of claim 49, wherein the determining step includes the steps of:
 obtaining a plurality of pulse values, each pulse value indicative of a magnitude of a separate synchronization pulse of the plurality of synchronization pulses,
 averaging the plurality of pulse values to obtain an average pulse value,
 compensating the average pulse value for the tagging signal to obtain a compensated pulse value, and
 determining the measurement value from the compensated pulse value.

52. The method of claim 48, wherein the control information includes a plurality of synchronization pulses and the determining step includes:
 determining from one or more synchronization pulses within the control information the measurement value.

53. The method of claim 52, wherein the determining step includes the steps of:
 obtaining a maximum amplitude value for the digitized RF signal over a predetermined interval, the maximum amplitude value indicative of a magnitude of a synchronization pulse of the plurality of synchronization pulses, and
 determining the measurement value from the maximum amplitude value.

54. The method of claim 53, wherein the determining step includes
 multiplying the maximum amplitude value by a predetermined constant to obtain the measurement value.

* * * * *